US012664672B1

(12) United States Patent
Roman et al.

(10) Patent No.: US 12,664,672 B1
(45) Date of Patent: Jun. 23, 2026

(54) LASER-LESS, NO EMISSION RANGE FINDING ARTIFICIAL INTELLIGENCE DEVICE AND METHODS

(71) Applicants: Kendyl A. Roman, Sunnyvale, CA (US); John Livacich, Los Gatos, CA (US)

(72) Inventors: Kendyl A. Roman, Sunnyvale, CA (US); John Livacich, Los Gatos, CA (US)

(73) Assignee: Evrio, Inc., Santa Clara, CA (US)

( * ) Notice: Subject to any disclaimer, the term of this patent is extended or adjusted under 35 U.S.C. 154(b) by 157 days.

(21) Appl. No.: 18/635,003

(22) Filed: Apr. 15, 2024

Related U.S. Application Data

(63) Continuation-in-part of application No. 18/431,980, filed on Feb. 4, 2024.

(51) Int. Cl.
| | |
|---|---|
| *G06T 7/536* | (2017.01) |
| *G02B 23/00* | (2006.01) |
| *G06V 10/147* | (2022.01) |
| *G06V 10/24* | (2022.01) |
| *G06V 10/26* | (2022.01) |
| *G06V 10/764* | (2022.01) |
| *G06V 10/774* | (2022.01) |
| *G06V 10/82* | (2022.01) |
| *G06V 40/10* | (2022.01) |

(52) U.S. Cl.
CPC .............. *G06T 7/536* (2017.01); *G02B 23/00* (2013.01); *G06V 10/147* (2022.01); *G06V 10/245* (2022.01); *G06V 10/26* (2022.01); *G06V 10/764* (2022.01); *G06V 10/774* (2022.01); *G06V 10/82* (2022.01); *G06V 40/10* (2022.01); *G06T 2207/20081* (2013.01); *G06T 2207/20084* (2013.01); *G06T 2207/20132* (2013.01); *G06V 2201/07* (2022.01); *G06V 2201/08* (2022.01)

(58) Field of Classification Search
CPC .......... G02B 23/00; G06T 2207/20081; G06T 2207/20084; G06T 2207/20132; G06T 7/536; G06V 10/26; G06V 10/82; G06V 10/147; G06V 10/245; G06V 10/764; G06V 10/774; G06V 2201/07; G06V 2201/08; G06V 40/10
See application file for complete search history.

(56) References Cited

U.S. PATENT DOCUMENTS

| | | | | |
|---|---|---|---|---|
| 2005/0041241 A1* | 2/2005 | Pahk | ...................... | G01B 11/08 356/237.1 |
| 2012/0308124 A1* | 12/2012 | Belhumeur | ....... | G06F 18/24155 382/159 |

(Continued)

*Primary Examiner* — Peet Dhillon

(57) ABSTRACT

An artificial intelligence (AI) device and methods for recognizing objects, such string support rods, birds, mammals, such as deer or elk, or vehicles, such as trucks or tanks, each object type having a known size, and to recognize the distance to each object. For training, embodiments comprise an AI device having an image sensor and optional laser rangefinder. For field use, embodiments comprise a trained AI model is embedded in a handheld or portable hand-carried device, providing a laser-less, no emission range finding device, such as smart rifle scopes, handheld rangefinders, smart binoculars, smart phones and tablets, the device used to select a target, determine the predicted distance to the target, and display a distance adjusted aiming point.

21 Claims, 23 Drawing Sheets

(56)                    References Cited

U.S. PATENT DOCUMENTS

| 2017/0070707 | A1* | 3/2017  | Winter | G06V 20/176 |
| 2021/0248748 | A1* | 8/2021  | Turgutlu | G06V 10/764 |
| 2021/0366139 | A1* | 11/2021 | Kim | G06T 7/55 |
| 2022/0101625 | A1* | 3/2022  | Vangal | G06V 10/23 |
| 2022/0155066 | A1* | 5/2022  | Selvaraj | G01C 3/16 |
| 2022/0174261 | A1* | 6/2022  | Hornstein | G06N 20/00 |
| 2022/0270371 | A1* | 8/2022  | Derbisz | G06V 10/764 |
| 2023/0360238 | A1* | 11/2023 | Alexander | G06T 7/12 |
| 2024/0185635 | A1* | 6/2024  | Kolla | G06V 40/171 |

* cited by examiner

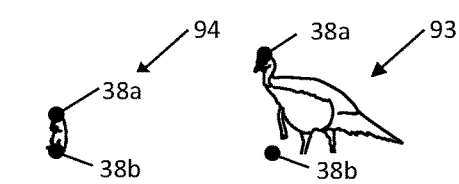
Fig. 23A      Fig. 23B
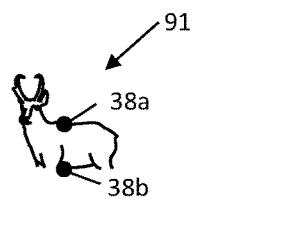    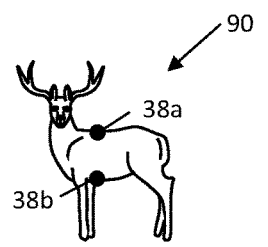    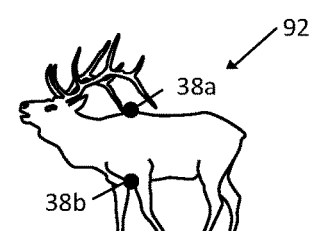
Fig. 23C      Fig. 23D      Fig. 23E
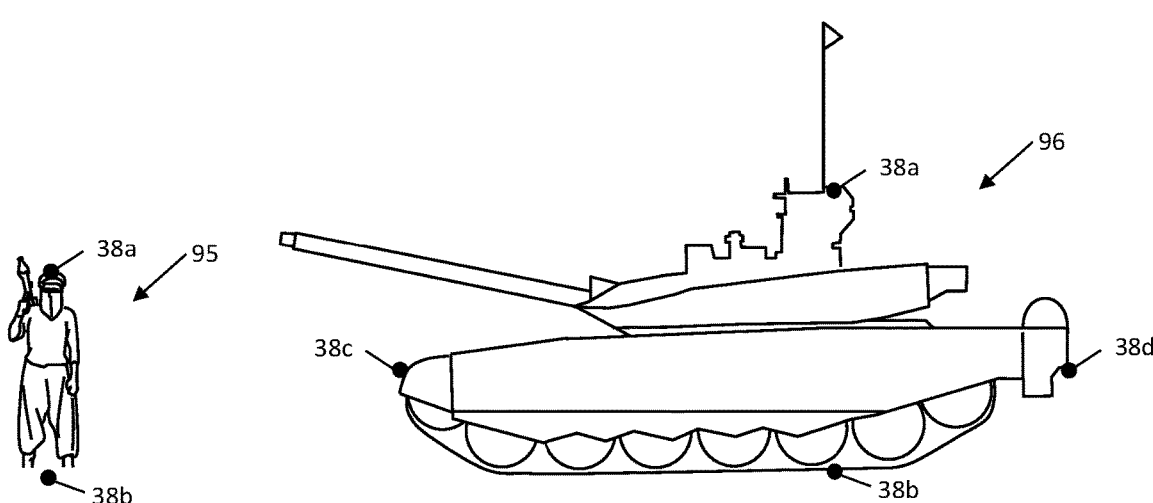
Fig. 23F      Fig. 23G

LASER-LESS, NO EMISSION RANGE FINDING ARTIFICIAL INTELLIGENCE DEVICE AND METHODS

CROSS-REFERENCE TO RELATED APPLICATIONS

This application is a continuation-in-part of co-pending U.S. patent application Ser. No. 18/431,980, filed Feb. 4, 2024.

PRIOR ART

Firing Device and Projectiles

Firing devices such as bows, crossbows, rifles, pistols, other guns, and artillery have been used for sport, hunting, law enforcement, and military. Each firing device is used to launch a projectile such as an arrow, dart, bullet, ball, or explosive shell along a projectile trajectory.

FIG. 1A shows a user (in this case, an archer) 100 with a bow 102 with a bow sight 110 and an arrow 104. The bow sight 110 comprises pins adjusted e.g., for twenty yards, forty yards, and sixty yards, namely a twenty-yard pin, a forty-yard pin, and a sixty-yard pin, respectively.

FIG. 1B shows a rifle with a rifle scope 302. Rifle balls and/or bullets are typically shot from a gun using the arms to aim and sight by aligning the gun sights or gun scope reticle with the target.

Artillery balls and shells are typically shot by adjusting the aim mechanically.

Arrows, spears, balls, bullets, and shells when fired follow a ballistic trajectory. Such projectiles, which are not self-propelled, move through air according to a generally parabolic curve due primarily to the effects of gravity.

The actual projectile trajectory path is not a perfect parabola in a plane due to many factors, such as air drag and lift, crosswind, head wind, tail wind, spin drift, and Coriolis effect. Each bullet type has a different weight and shape which affects the ballistic trajectory. Ballistic coefficients can be determined of each bullet. Drag is affected by environmental factors such as temperature, humidity, and barometric pressure.

The Army Research Laboratory published Wind Drift of Projectiles: A Ballistics Tutorial, ARL-TR-1124, by Herbert A. Leupold, October 1996.

*Let's Code Physics, Projectile Motion* 12—*Drag and Wind* teaches programming models for drag and wind on projectiles. Source code is available at the letscodephysics Google Site (Let's Code Physics/projectile motion/12 3D projectile motion—football field goal—w wind.py).

Rifle and bow scopes conventionally have been fitted with reticles of different forms. Some have horizontal and vertical crosshairs. These reticles are fixed in that the display does not change based on range information. Also, these reticles indicate the approximate hold-over position in that they are positioned under the center of the scope, i.e., below where the crosshairs intersect. They are not necessarily precise, for example, for a specific bow and archer or for a specific rifle and cartridge but are approximation for the general case.

Smart Devices

Hunters and other firearm and bow users commonly utilize handheld rangefinders (see device 6 in FIG. 1A) to determine ranges to targets. Generally, handheld rangefinders utilize lasers to acquire ranges for display to a user. Utilizing the displayed ranges, the user makes sighting corrections to facilitate accurate shooting. Handheld rangefinders, telescope sights, and other optical devices typically comprise a laser range sensor and an inclinometer.

Our U.S. Pat. No. 9,057,587, issued Jun. 16, 2015, and U.S. Pat. No. 9,068,795, issued Jun. 30, 2015, both included by reference, disclose and claim a smart rangefinders which: a) provide an aiming point; b) provide a digital rangefinder having a video camera and high-resolution digital display; and c) displays an aiming point, corrected for range and wind effect anywhere on the high-resolution display.

These patents also disclose the use of a smart phone, such as an iPhone, as a display for a digital rangefinder.

RADAR, Light Detecting and Ranging (LIDAR) and Other Emission Technologies

Similar, to RADAR, Light Detection and Ranging (LIDAR) emits light and detects reflected light to determine range to objects.

Laser, radar and lidar are commonly used in automated cruise control, such as Toyota Intelligent Adaptive Cruise Control, and in fully autonomous self-driving vehicles, such as Waymo robotaxi or Aurora Driver cars and Aurora Horizon semi-trucks (18-wheeler freight trucks).

Artificial Intelligence Advances

The U.S. Defense Advanced Research Projects Agency (DARPA) funded the Cognitive Assistant that Learns and Organizes (CALO) project for five years from 2003 to 2008. CALO brought together over 300 researchers from 25 of the top university and commercial research institutions. Software and documentation are available on the PAL website: https://pal.sri.com.

Several AI technologies have spun off from the CALO work, including, for example, Apple's Siri speech recognition, analysis, and speech synthesis.

In October 2006, Intel released version 2 of Open Source Computer Vision Library (OpenCV 2). In August 2012, opencv.org began providing support for OpenCV. Applications for OpenCV include object detection and facial recognition systems. Open source code repositories are available on github.com e.g., opencv/opencv.

In 2013, NVIDIA introduced the Tegra 4. With NVIDIA GPU-accelerated deep learning frameworks, researchers and data scientists can significantly speed up deep learning training that could otherwise take days and weeks to just hours and days. When models are ready for deployment, developers can rely on GPU-accelerated inference platforms for the cloud, embedded device, or self-driving cars, to deliver high-performance, low-latency inference for the most computationally-intensive deep neural networks. https://www.nvidia.com/en-us/glossary/deep-learning/.

In June 2014, Facebook AI Research in Menlo Park, CA, published *DeepFace: Closing the Gap to Human-Level Performance in Face Verification*. DeepFace discloses the use of a four-stage pipeline, comprising: detect, align, represent, and classify. In its deep learning model, the representation stage uses a nine-layer deep neural network. The paper discloses an architecture comprising a front-end of a single convolution-pooling-convolution filtering on the rectified input, followed by three locally-connected layers and two fully-connected layers.

Images are aligned by detecting 6 initial fiducial points inside the detection crop (bounding rectangle) centered at the center of the eyes, tip of the nose and mouth locations. The detected face is scaled, rotated, and translated. Additional fiducial points are identified in the 2D-aligned crop. The image is 3D aligned by transforming Delaunay triangulation derived from the 67 fiducial points. The 3D-aligned image is given to the first layer of a large deep neural network.

As explained by Sefik Ilkin Serengil, the DeepFace deep learning model is a layered convolutional neural network. Each layer is named with a letter and number. The number refers to the index from 1 to 8 and letter states the type of layer. C refers to convolutional layer, M refers to max pooling, L refers to locally connected layer and F refers to fully connected layer. https://sefiks.com/2020/02/17/face-recognition-with-facebook-deepface-in-keras OpenFace is open source code. https://github.com/cmusatyalab/openface OpenFace includes the FaceBook neural network source code. https://github.com/facebookarchive/fbnn In December 2014, Baidu Research's Silicon Valley AI Lab, published *Deep Speech: Scaling up end-to-end speech recognition*. Deep Speech trained a large recurrent neural network (RNN) using multiple GPUs and thousands of hours of data. The structure of the RNN model is disclosed in the paper.

Cornell University's Cornell Lab of Ornithology, Merlin project was funded by the Natural Science Foundation. Photo ID, released Nov. 30, 2017, uses computer vision technology, developed as part of Dr. Grant Van Horn's doctoral work at Caltech, to identify birds in photos. Sound ID, released Jun. 23, 2021, learned to recognize the vocalizations of different bird species. Sound ID was trained on audio recordings that are first converted to visual representations (spectrograms), then analyzed using computer vision tools similar to those of Photo ID. Both Photo ID and Sound ID run on smart phones, such as the Apple iphone. https://merlin.allaboutbirds.org Grant Van Horn's PhD thesis is entitled Towards a Visipedia: *Combining Computer Vision and Communities of Experts*, and details recent advances in the use of deep convolutional neural networks in image analysis.

U.S. Pat. No. 11,140,312 was filed by Swarovski-Optik Jul. 17, 2020 (Swarovski '312). U.S. Patent Application 2023/0283882 published Sep. 7, 2023 (Swarovski '882). Both disclose a smart binocular.

FIG. 2 shows binocular 400 comprising a housing 20 supporting an eyepiece 22, a lens 24, an input, an operating button, 32. The components inside the housing 20 comprise: computing element 16, memory 18, wireless communications 19, image sensor (digital camera) 25, audio sensor 29. Swarovski claims require several other elements. Swarovski discloses using the wireless communications 19 to communicate with a smart phone, such as an iphone 11 (not shown) having a high-resolution, touch screen display 31 (not shown). While Swarovski '312 suggests that the smart phone 11 separately execute a mobile app which can recognize an image of a bird, it does not disclose a deep learning model running on the computing element 16 of the binocular 400. The type of bird is recognized by means of a remote image database and an image recognition algorithm. Further, Swarovski '312 discloses using the operating button 32 to start the image capture for object recognition, object detection, and object classification to be executed on the smart phone 11.

In January 2024, Swarovski Optik announced smart binoculars, namely, AX Visio 10×32 binoculars, comprising a neural processing unit (NPU) for object recognition processing, which identifies over 9,000 species of birds and mammals using Merlin Photo ID and Sound ID image recognition technology.

In January 2024, Apple unveiled chips having capabilities to run generative AI, for example, supporting billions of data parameters. The S9 chip allows Siri to access and log data without connecting to the Internet. The A17 Pro chip in the iPhone 15 comprises a neural engine which is twice as fast as previous generations. These advances will allow AI models to run directly on iPhones.

Thus, the deep learning models for recognizing and characterizing audio and images, as well as source code for implementing them, GPU systems for learning, and hand-held devices for operating those deep learning models are well known in the art.

Windage and Elevation

For hundreds of years, hunters and soldiers have learned the mantra "Windage and Elevation."

However, there has been a long felt need to be able to accurately recognize the winds impact on a projectile and to quickly and dynamically make adjustments despite constant changing, difficult to interpret changes in the wind. Wind adjustment has been largely guesswork.

Until now accurate wind recognition has been the "Holy Grail" sought after by the industry.

What is needed is a device and methods for recognizing wind along a projectile trajectory path so that a user can accurately aim and hit a desired target regardless of the wind speed and direction at different points along the path. Further, what is needed is an indication that wind currently is in a likely sustained favorable state for a brief period of time, such that a user has time to aim and fire.

The parent application addresses the need for accurate wind recognition.

Our patented Flight Path® technology (disclosed, for example, in U.S. Pat. No. 9,057,587 referenced above) currently available in Leupold RX-FullDraw 5 and RX-1400i True Ballistic Range/Wind (TBR/W) Gen 2, does an excellent job of handling elevation by providing an aiming point corrected for shoot angle, distance, and ballistics along a vertical plane including the line of sight to a desired target.

However, laser range finding devices have disadvantages: first, laser-based range finding devices must emit laser light in order to operate; second, the laser emissions require electrical power; and third, the laser emission, detection, and analysis require specialized hardware devices, lenses, and processing power.

Laser, radar, or lidar emissions are detectable by a target. Law enforcement and military use laser and other emissions to detect range to a target. However, devices which detect laser or other emissions are available and are used by law enforcement and military targets to be alert, to put up shields, or to move away from the projectile path. Even worse, laser beams can be tracked precisely back to the source and the target can use that information to accurately return fire.

Handheld range finding devices are battery powered. Batteries add weight, cost, and replacement and waterproofing challenges to handheld range finding devices. Reducing power consumption allows for simpler, lower cost products.

Specialized laser hardware devices and lenses contribute to the cost, size, and weight of the laser-based range finder.

Thus, there has been a long felt need to be able to accurately recognize the distance to a target without emitting a laser beam or making other detectable emissions.

What is needed is a device and methods for recognizing distance to a target without emitting a laser beam and to accurately aim and hit a desired target.

BACKGROUND OF THE INVENTION

The parent invention relates to detection of wind, in particular the detection of wind that affects a projectile trajectory path to a desired target, including the use of artificial intelligence (AI) to observe a string supported by flexible rods, positioned along a segment of the projectile trajectory path, and to recognize the wind effect on the object.

The present invention relates to the use of AI in a handheld or portable hand-carried device to observe objects, such string support rods, birds, mammals, such as deer or elk, or vehicles, such as trucks or tanks, each object type having a known size, and to recognize the distance to each object.

The AI is embedded in an AI device having an image sensor and optional laser rangefinder for training the AI. The present invention also relates to devices such as smart rifle scope, handheld rangefinders, smart binoculars, smart phones, and smart tablets which comprise a trained AI, the device is used to select a target, determine the predicted distance to the target, and display a distance adjusted aiming point.

SUMMARY OF THE INVENTION

The present invention solves the above-described problems and provides a distinct advance in the art of AI devices visually recognizing distance to a target object.

The present invention provides devices and methods for recognizing distance to a desired target without using a laser or other emission. The present invention also identifies and displays the type of object that is targeted, based on a magnified image of the target object. Such information facilitates accurate, effective, and safe firing device use by providing an identification of the target object and an aiming point.

The AI device further comprises a computing element, a memory, a display, at least one image sensor and at least one lens with a known magnification. The AI device captures a magnified digital image of a target object, recognizes the type of object, and calculates a preliminary distance to the target based on a known size of the object type and the known magnification of the digital image. The deep learning model operates on the computing element and memory and calculates an estimated distance.

In some embodiments, the computing element determines a bounding rectangle in the digital image which includes the target object, and crops the digital image based on the bounding rectangle.

In some embodiments, the computing element determines a plurality of fiducial points inside the bounding rectangle based on the object type.

In some embodiments, the computing element performs a 2D or 3D alignment of the target object based on the fiducial points.

In some embodiments, the computing element recognizes a top fiducial point and a bottom fiducial point, and determines a size based on the number of pixels between the top and bottom fiducial points.

The display may include one or more crosshairs for aiming the AI device at a desired target.

In one embodiment, the AI device further comprises wireless communication to communicate wirelessly with remote sensors, such as wind meters (also known as anemometers) or other atmospheric meters, or with a handheld rangefinder, smart scope, smart binocular, or other device.

The deep learning model comprises a deep neural network.

In some embodiments, the deep neural network is a convolutional neural network.

In some embodiments, a cropped image or a cropped aligned image is an input to the deep learning model.

During training, inputs to the deep learning model comprise a cropped image of the object and data regarding the object such as: type of object, distance to object, size of the object between two fiducial points, gender, maturity, species, ethnicity, or geographic region.

During operation, the AI device recognizes the type of object, a top fiducial point and a bottom fiducial point based on the object type, and calculates a preliminary distance based on a known size of the type of object and the known magnification of the digital image.

In some embodiments, during operation the deep learning model further classifies the target object in classes, such as species, gender, maturity, vehicle type, vehicle make and model, vehicle year, and computes a more accurate final distance to the target based on the one or more classifications.

Natural object types may include deer, antelope, elk, wild boar, turkey, ground hog or other common game animals. Species classification may include, for example, mule deer, whitetail deer, blacktail deer, etc.

Man-made object types may include sedan, pickup truck, box truck, semi-truck (e.g., 18-wheeler), airplane, drone, tank. Vehicle classification may include make and model such as Toyota Tacoma, Ford F-450, General Dynamics M1 Abrams tank, British Challenger 1 tank, BAE Systems Challenger 2 tank, HESA Shahed 136 drone, or ZALA Lancet-3 drone.

A method embodiment of using the AI device comprises the steps of:
- a) training the deep learning model with a multiplicity of images of different types of objects and their distances,
- b) aiming the AI device at the target by placing the crosshairs over the target,
- c) pressing an operating button on the AI device, and
- d) displaying a preliminary distance on the display.

In some method embodiments, the deep learning model classifies the target object and displays a more accurate final distance to the target based on the more precise classification.

The classification, such a species or vehicle type or model, may also be displayed for user confirmation or education.

In some laser-less, no emission range finding device embodiments, the AI device comprises crosshairs for precisely aiming the device at a target and a means for sensing the angle to the target, such as an inclinometer, gyroscope, or accelerometer, wherein the AI device calculates a shoot for distance which is the estimated range to the object adjusted for shooting angle.

In some laser-less, no emission range finding device embodiments, the AI device is a handheld laser-less rangefinder.

In some laser-less, no emission range finding device embodiments, the AI device is a weapon mounted laser-less rifle scope.

In some laser-less, no emission range finding device embodiments, the AI device is a handheld laser-less binocular.

In some laser-less, no emission range finding device embodiments, the AI device is a handheld smart phone, such as an iPhone or Android phone.

In some laser-less, no emission range finding device embodiments, the AI determines a dynamic aiming point based on current wind and final distance and displays the aiming point when the wind is stable.

In some embodiments, a first image sensor is configured with a low magnification lens providing a low magnification digital image and a second image sensor is configured with a high magnification lens providing a high magnification digital image, and the display is configured to show both the low magnification digital image and the high magnification digital image.

In an embodiment with a high-resolution digital display, the low magnification digital image is displayed with crosshairs and is used to aim the AI device, and the high magnification digital image is used by the deep learning model to determine the final distance to the target.

In other embodiments, the AI device detects a plurality of objects and determines a final range to two or more of the objects.

In laser-less, no emission handheld rangefinder embodiments, objects of known size are detected and the distance or range to each object is determined by measuring the object's height in pixels, and calculating the line of sight distance to the object, using a known magnification factor of the lens. In some embodiments, the AI device comprises a tilt sensing means, such as a gyroscope or inclinometer. For example, the TDK InvenSense 9-Axis MEMS Motion Sensors combine a 3 axis gyroscope, 3 axis accelerometer, and 3 axis compass in the same chip together with an onboard Digital Motion Processor (DMP) capable of processing the complex MotionFusion algorithms. The source code for interfacing with any combination of gyroscope, accelerometer, or compass is available as open source. For example, Android Sensors are virtual devices that provide data coming from a set of physical sensors: accelerometers, gyroscopes, magnetometers, barometer, humidity, pressure, light, proximity and heart rate sensors. See the Android Open Source Project https://cs.android.com/android/platform/superproject.

Other aspects and advantages of the present invention will be apparent from the following detailed description of the preferred embodiments and the accompanying drawing figures.

Objects and Advantages

Accordingly, the present invention provides the following objects and advantages:

To provide a display that provides dynamic information regarding a projectile trajectory.

To provide a lightweight rangefinder comprising a high-resolution display and a digital camera, wherein the display provides an aiming point adjusted for wind and distance.

To provide lightweight, handheld AI device for recognizing distance to a desired target without emitting a laser beam or other radiation.

To provide an AI device, having a deep learning model, which is trained to recognize objects of known size and use the object size to determine distance.

To provide a laser-less, no emission handheld or portable range finding device.

BRIEF DESCRIPTION OF DRAWINGS

A preferred embodiment of the present invention is described in detail below with reference to the attached drawing figures, wherein:

FIG. 10A illustrates the AI device with a string and rods, positioned along a projectile trajectory path to a target, FIG. 10B illustrates an image captured by the AI device showing string shape and position, visually relative height of the flexible rods supporting the string, and the flex of the rods, FIG. 10C illustrates a detection crop of the image with four bounding points forming a bounding rectangle containing the cropped image of the string and rods, FIG. 10D illustrates fiducial points found on the string and rods, FIG. 10E illustrates fiducial points defining the shape and position of the string, FIG. 10F illustrates fiducial points defining the flex of the flexible rod;

FIG. 14B includes indicators of a steady state of optimum wind;

FIGS. 22A through 22G illustrate detection of objects with known sizes;

FIGS. 23A through 23G show fiducial points for each detected object;

Figure 1A:
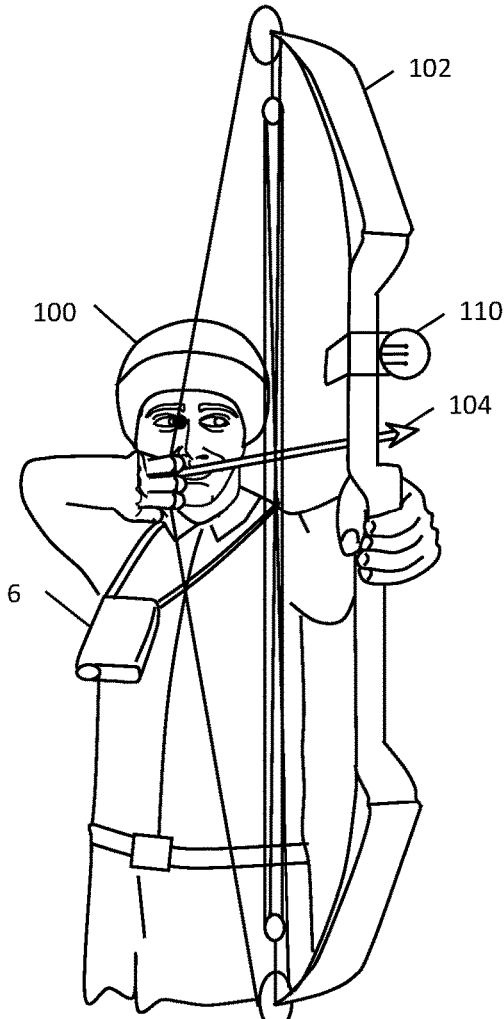
FIG. 1A illustrates an archer with a bow with a bow sight.
Figure 1B:
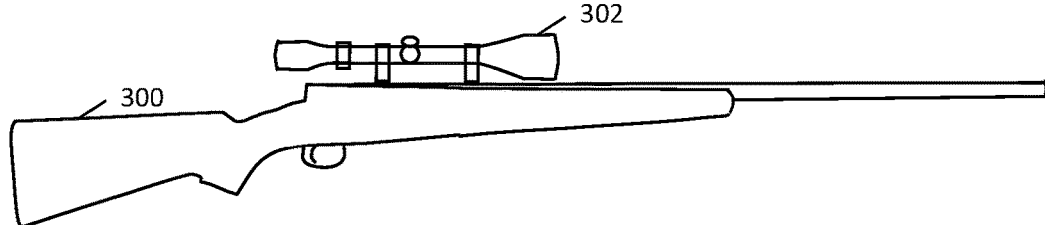
FIG. 1B illustrates a rifle with a scope.

The drawing figures do not limit the present invention to the specific embodiments disclosed and described herein. The drawings are not necessarily to scale, emphasis instead being placed upon clearly illustrating the principles of the invention.

REFERENCE NUMERALS IN DRAWINGS

1 line of departure
1 line of departure
2 projectile trajectory
3 line of sight
4 horizontal line
6 rangefinder
10 AI device
11 iPhone
13 range sensing means
15 9-axis sensor
16 computing element
18 memory
19 wireless communications
20 housing
21 alternate housing
22 eyepiece
24 $a$-$b$ lens
25 image sensor (digital camera)
26 distal end
28 proximate end
29 audio sensor
30 display
31 high-resolution display
32 inputs
35 visor or shroud
36 image
37 $a$-$c$ bounding point
38 $a$-$i$ fiducial point
40 $a$-$c$ string
42 crosswind
44 headwind
46 tailwind
48 wind
52 crosswind vector

56 tailwind vector
90 deer
91 antelope
92 elk
93 turkey
94 ground hog
95 man
96 tank
97 grass
100 archer or user
102 bow
104 arrow
106 flexible rod
110 bow sight
199 $a$-$c$ extension
300 rifle
320 twenty-yard line
340 forty-yard line
400 binocular
680 $a$-$c$ wind sensor
800 marking pattern
802 dark band
804 light band
900 $a,b$ crosshairs
902 magnification outline
914 $a$-$d$ horizontal distance indicator
918 left/right indicator
922 crosswind indicator
924 green indicator
926 yellow indicator
928 red indicator
930 (selectable) path indicators
944 tailwind indicator
982 $a,b$ aiming point
1052 antelope reference image
1054 deer reference image
1070 inserting end (male)
1072 receiving end (female)
1097 protrusion indicator
2235 horizontal leg
3094 locking channel
3104 sleeve
3196 outward protrusion
3450 stake
3454 stake member
P $a$-$c_{;0,\ 20,\ 40}$ point
$\theta$ angle
T target
V vertex

DETAILED DESCRIPTION OF THE INVENTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the present invention. The following detailed description is, therefore, not to be taken in a limiting sense. The scope of the present invention is defined only by the appended claims, along with the full scope of equivalents to which such claims are entitled.

The String

Figure 19:
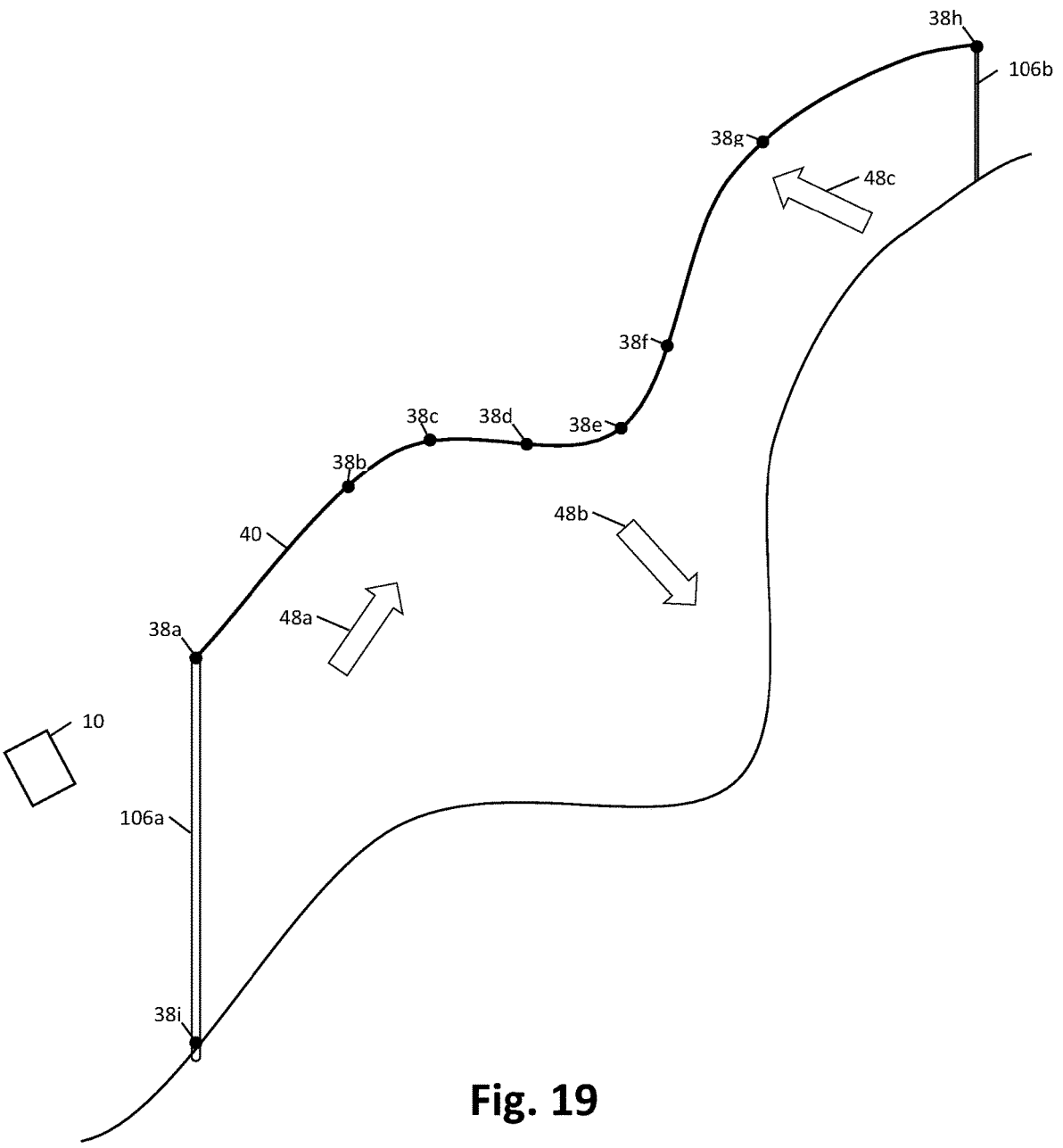
FIG. 19 illustrates a string and flexible rods placed in a harsh, rough environment with hills and valleys and strong winds at different speeds and directions along the projectile trajectory path.

Over a decade ago we performed an experiment with a 270-yard string 40 supported by two flexible rods 106 in a harsh, rough environment with hills and valleys and strong winds at different speeds and directions along the projectile trajectory path to a target T (see FIG. 19). We discovered that the "string is the teacher." By observing the effects of the combined winds on the string, including both the sounds and the visual image of the string and the flexible rods, a human users could determine a period of consistent wind, adjust their aim for that wind, and repeatedly hit the target using that aim each time the users sensed the presence of the optimum steady wind conditions. The sound of the wind was easier to distinguish at higher wind speeds. In our experiment, the string taught us how to adjust our aim and when we could repeat a shot under the same and highly similar instantaneous wind conditions. The bullets consistently hit a desired target at 270 yards in strong dynamic wind conditions.

In our experiment, we used a 600-yard spool of 80-pound test Izorline braided low stretch Dacron fishing line, UPC 8783700307. The string was white with "greenspot" spiral markings.

We discovered that the string is the teacher. What was needed were low cost, light weight, portable platforms with high quality optics, digital camera, and computing capabilities so that we could implement a machine learning solution which could also be taught by the string and could instantaneously observe current wind effects and provide crosswind, headwind/tailwind, information; could determine a presence of a stable optimum wind, and an adjusted aiming. With advances in AI technology and platforms that can be made available to general users, we can now implement our invention as devices and methods for recognizing wind along a projectile trajectory path so that a user can accurately aim and hit a desired target regardless of the wind speed and direction at different points along the path, and provide an indication that wind currently is in a likely sustained favorable state for a brief period of time, such that a user has time to aim and fire.

More recently, we have experimented with supporting the string with flexible rods with equal height, e.g., 5-foot rods, preferably with 6-inch bands of darker color and/or reflective materials. We have experimented with different strings and have had good results with green mono filament line. To aid in recognizing the wind, by observing the string, it is useful to know the amount of string. An AI device can recognize the distance of an object of a known size, such as the flexible rod, animal, bird, or vehicle, by analyzing its visually apparent size in the image at a known magnification.

Accordingly, we disclose the following AI devices and methods in a handheld or portable hand-carried device to observe objects, such string support rods, birds, mammals, such as deer or elk, or vehicles, such as trucks or tanks, each object type having a known size, and to recognize the distance to each object. The AI is embedded in an AI device having an image sensor and optional laser rangefinder for training the AI. The present invention also relates to devices such as smart rifle scope, handheld rangefinders, smart binoculars, smart phones, and smart tablets which comprise a trained AI, the device is used to select a target, determine the predicted distance to the target, and display a distance adjusted aiming point.

AI Device

Figure 3:
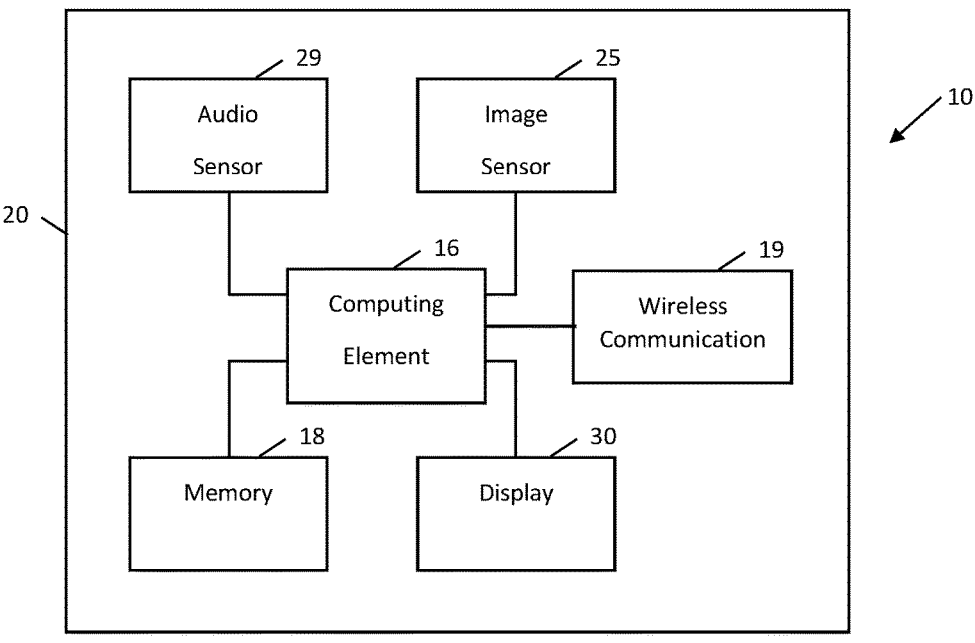
FIG. 3 is a block diagram of an AI device.

FIG. 3 illustrates our novel AI device 10 comprises a computing element 16, coupled with an audio sensor 12 or an image sensor 14, a display 30. A housing 20 contains the elements of the device 10.

Figure 4:
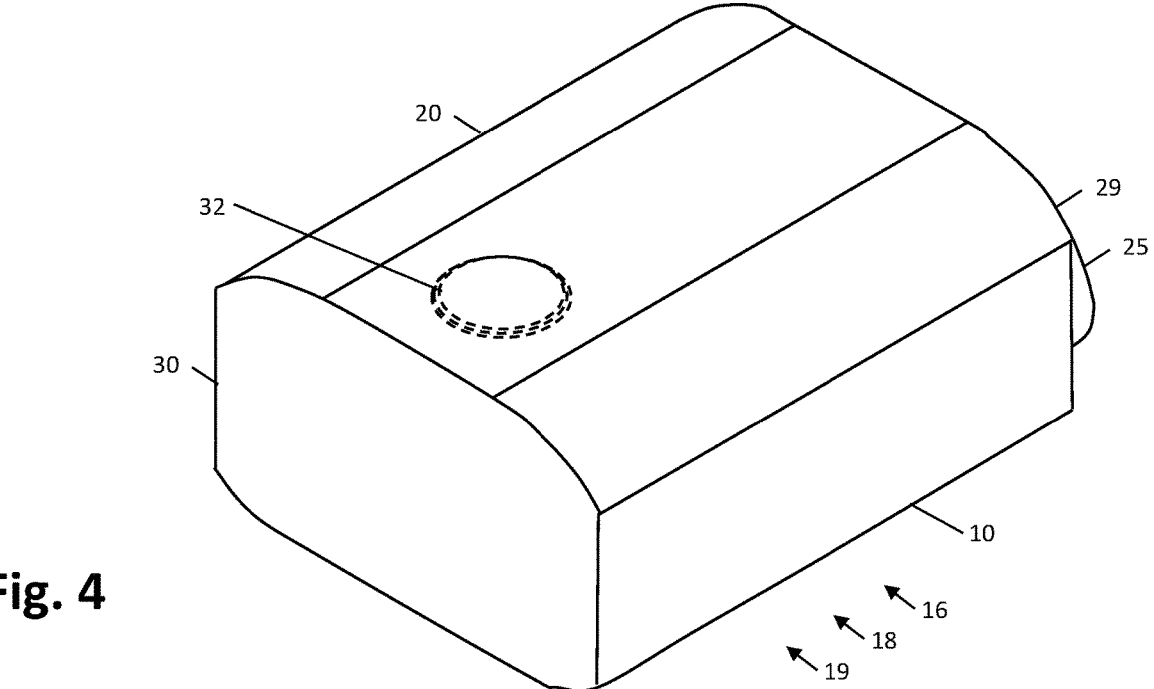
FIG. 4 illustrates the AI device in a housing and an operating button input.

FIG. 4 shows our novel AI device 10 comprising a housing 20 supporting a display 30, an operating button input 32. The components inside the housing 20 comprise: computing element 16, memory 18, wireless communications 19, image sensor (digital camera) 25, audio sensor 29. One or both, of the image sensor 25 and the audio sensor 29, is configured in different embodiments.

The display 30 could be a high-resolution, touch screen display 31 (see FIGS. 10B, 15A through 15C, 16, 17, 18, 24A and 24B).

Figure 2:
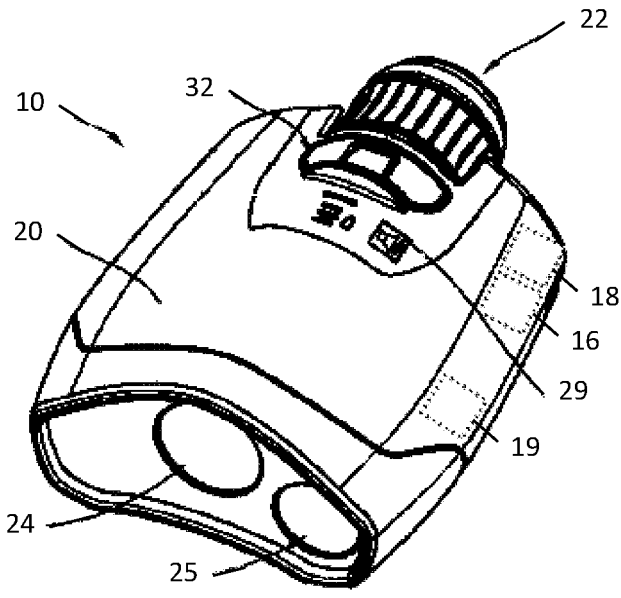
FIG. 2 illustrates a smart device with a digital camera image sensor.

Comparing FIG. 4 to FIG. 2 results in understanding that while Swarovski binocular is an enabling platform for our present invention, it contains elements which are not required by our present invention. In other words, the reader should understand that the present invention could be implemented entirely on a Swarovski binocular or similar device but could also be implemented as disclosed herein without requiring the invention claimed by Swarovski. Further, Swarovski only clearly discloses identification of birds and mountain peaks. It is silent on determining range, on recognizing wind, or on projectile trajectory paths.

The handheld housing 20 enables AI device 10 to be easily and safely transported and maneuvered for convenient use in a variety of locations.

For example, the portable handheld housing 20 may be easily transported in a backpack for use in the field. Additionally, the location of the components on or within the housing 20 and the location of the button 32, enables AI device 10 to be easily and quickly operated by the user with one hand without a great expenditure of time or effort.

A computer program preferably controls input and operation of the AI device 10. The computer program includes at least one code segment stored in or on a computer-readable medium residing on or accessible by AI device 10 for instructing computing element 16, image sensor 25, audio sensor 29, and any other related components to operate in the manner described herein. The computer program is preferably stored within the memory 18 and comprises an ordered listing of executable instructions for implementing logical functions in AI device 10. However, the computer program may comprise programs and methods for implementing functions in the device 10 which are not an ordered listing, such as hard-wired electronic components, programmable logic such as field-programmable gate arrays (FPGAs), application specific integrated circuits, conventional methods for controlling the operation of electrical or other computing devices, etc.

Similarly, the computer program may be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

AI device 10 and computer programs described herein are merely examples of a device and programs that may be used to implement the present invention and may be replaced with other devices and programs without departing from the scope of the present invention.

The computing element 16 is coupled with image sensor 25, audio sensor 29, wireless communication 19, 9-axis sensor 15 (FIG. 20) to determine ballistic information relating to the target T, including wind effect information, range, and shooting angle, as is discussed herein. The computing element 16 may be a microprocessor, microcontroller, or other electrical element or combination of elements, such as a single integrated circuit housed in a single package, multiple integrated circuits housed in single or multiple packages, or any other combination. Similarly, the computing element 16 may be any element that is operable to determine clear shot information from the range and angle information as well as other information as described herein. Thus, the computing element 16 is not limited to conventional microprocessor or microcontroller elements and may include any element that is operable to perform the functions described.

The memory 18 is coupled with the computing element 16 and is operable to store the computer program and a database including trained representation and classification for comparison, and configuration information. The memory 18 may be, for example, an electronic, magnetic, optical, electromagnetic, infrared, or semi-conductor system, apparatus, device, or propagation medium.

The device 10 also preferably includes a display 30 to indicate relevant information such as the crosshairs 900, distance indicator 910, and other indicators disclosed herein. The display 30 may be a conventional electronic display, such as an OLED, TLED LED, TFT, or LCD display, or a higher resolution pixel matrix, e.g., with a resolution of 304×256.

The inputs 32 are coupled with the computing element 16 to enable users or other devices to share information with AI device 10. The inputs 32 are preferably positioned on the housing 20 to enable the user to simultaneously view the display 30 and function the inputs 32.

The inputs 32 preferably comprise one or more functionable inputs such as buttons, switches, scroll wheels, etc., a touch screen associated with the display 30, voice recognition elements, pointing devices such as mice, touchpads, trackballs, styluses, combinations thereof, etc. Further, the inputs 32 may comprise wired or wireless data transfer elements.

Training

Figure 5:
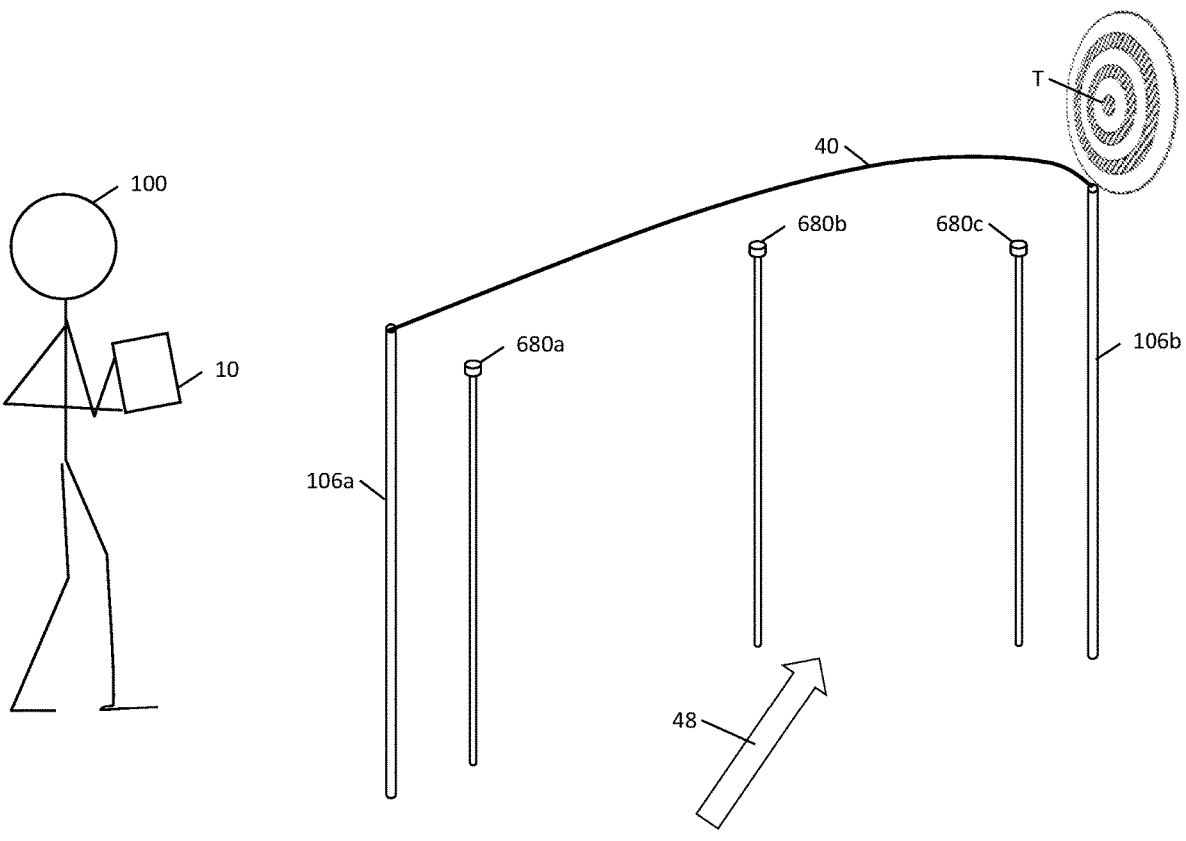
FIG. 5 illustrates the training of the AI device with a string, supported by a near rod and a far rod, and wind sensors, positioned along a projectile trajectory path to a target.

FIG. 5 illustrates the training of the AI device 10 with a string 40 and wind sensors 680*a* through 680*c*, positioned along a projectile trajectory path to a target T.

The user 100 is shown with the AI device 10. The string 40 is supported two flexible rods 106, namely near rod 106*a* and a far rod 106*b*. The rods 106 hold the string 40 off the ground in the wind 48 along at least a segment of the projectile trajectory path 2 (shown, for example, in FIG. 6A and FIG. 6B). In other embodiments for wind detection, the string could be attached to two fixed points one at each end.

Figure 13:
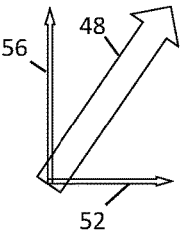
FIG. 13 illustrates crosswind and tailwind vector elements of wind.

The string 40 shows that the wind 48 has both a tailwind and left moving cross wind (see FIG. 13). The tailwind is evidenced by the curve of the string 40 toward the target T, at the far rod 106*b*. The left moving crosswind is evidenced by the curve of the string 40 toward the left of the line of sight to the target, and to the left of the two rods 106.

The AI device 10 is positioned where it can sense the string 40 and the rods 106. In some embodiments, the AI device 10 senses the sound made by the wind 48 as it moves and passes over the string 40. In some embodiments, the AI device 10 senses the image made by the wind 48 as it dynamically moves the string 40 and flexes the rods 106. In other embodiments it senses both sound, with the audio sensor 29 (FIG. 3 and FIG. 4), and photos or videos, with the image sensor 25 (FIG. 3 and FIG. 4).

A plurality of conventional wind meters 680 (also known as anemometers) are shown positioned along path of the string 40.

Wind meters are well known in the art, such as Kestrel 1000 wind meter or the Kestrel 3550FW fire weather meter. Wind meters are known to provide wind direction and speed via wireless communications.

The parent application introduces a new class of anemometer, namely, a string anemometer which senses the wind along the full path to a target, not just a few finite points along the path.

Our U.S. Pat. No. 8,795,109, issued Aug. 5, 2014, and U.S. Pat. No. 9,482,505, issued Nov. 1, 2016, both included by reference, disclose and claim a wind tracking apparatus which can be deployed by shooting an arrow comprising an wind meter or wind sensor 680 on nock end of the arrow, which then wireless transmits wind speed and direction. One wind meter or sensor was disclosed as an ultrasonic anemometer.

A large multiplicity of images 36 (FIG. 10B) and/or audio are captured by an embodiment of the AI device 10, such AI device 10 of FIG. 2, or other conventional recording means such as cameras, audio records, or smart phones 11, such as iPhones. The multiplicity of images 36 (FIG. 10B) and/or audio are capture while observing the string 40 during thousands of different wind conditions. With each image or audio capture, the wind information from the plurality of wind meters 680 are received wirelessly and stored in a dataset along with each image or audio recording. The dataset is used as input to train the deep learning model of the AI device 10.

Projectile Trajectory Paths

Figure 6A:
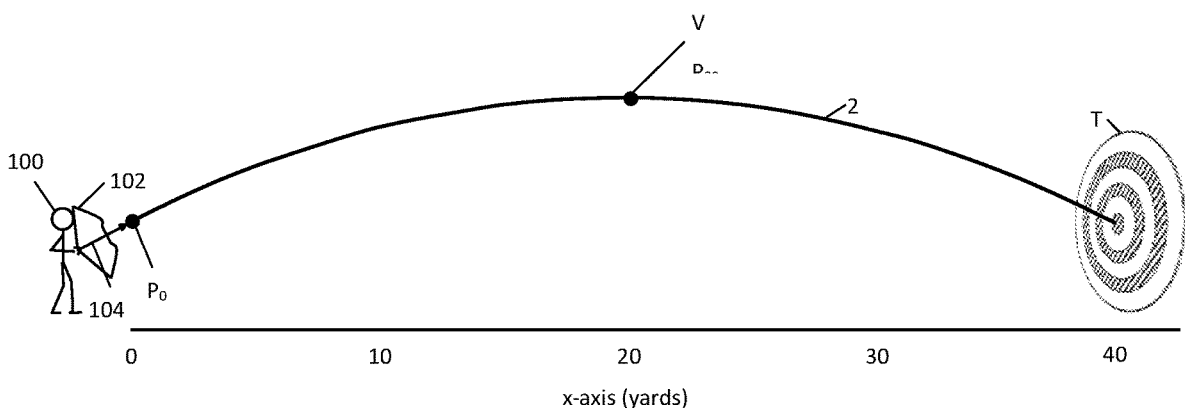
FIG. 6A illustrates an archer with a bow and the projectile trajectory path of an arrow to a target.

FIG. 6A illustrates an archer 10 with a bow 102 and the projectile trajectory path 2 of an arrow 104 to a target T. As discussed above the path is generally parabolic but is affected by many factors for the true ballistic path.

As shown in FIG. 6A the arrow starts at point $P_0$ and at 20 yards pass through point $P_{20}$, which is the vertex V of the projectile trajectory path 2, when aimed at a 40-yard target T.

Figure 6B:
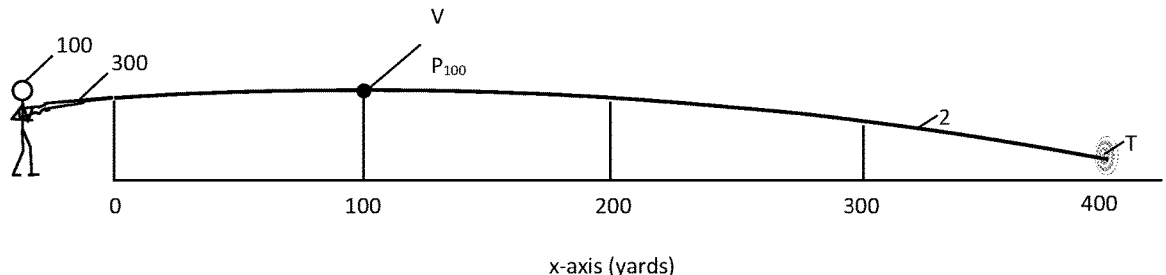
FIG. 6B illustrates a user with a rifle and the projectile trajectory path of a bullet to a target.

FIG. 6B illustrates a user with a rifle 300 and the projectile trajectory path 2 of a bullet to a target T.

As shown in FIG. 6B the bullet starts at point about 5 feet above the ground and then climbs to a vertex V at 100 yards, passing through point $P_{100}$, when the rifle is aimed at a 400-yard target T. The vertex V about 5½ feet above the ground (e.g., 6-inch rise). The path is about 5 feet at 200 yards and 3½ feet at 300 yards. The path drops off quickly to the target during the last 100 yards as the bullet velocity drops due to wind drag.

As seen in both FIG. 6A and FIG. 6B, the projectile trajectory path 2 is higher than the height at $P_0$. Accordingly, the wind may be different at different height, and it would be preferred to recognize the wind 48 at different heights.

Multiple String Segments at Different Heights

Figure 7A:
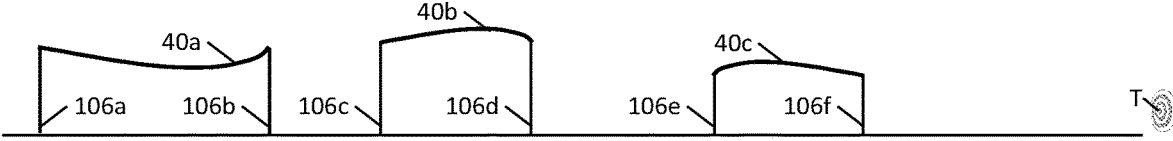
FIGS. 7A through 7C illustrate a plurality of strings, each positioned at different segments and heights along a projectile trajectory path to a target.
Figure 7B:
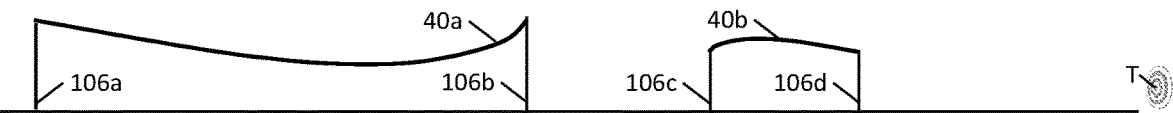
Figure 7C:
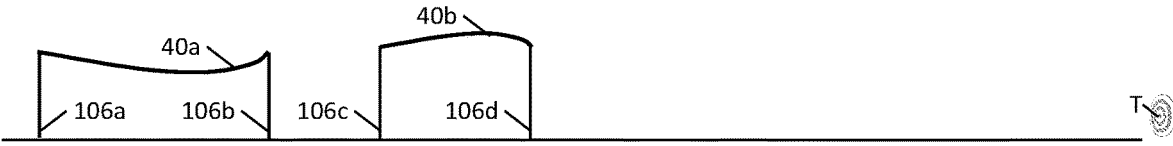

FIGS. 7A through 7C illustrates a plurality of strings 40, each positioned at different segments and heights along a projectile trajectory path 2 (shown in FIG. 6A and FIG. 6B) to a target T. As shown in each figure, the wind's effect on the string 40 may be different in each segment.

FIG. 7A shows three strings 40*a* through 40*c*, respectively, support by pairs of rods 106, 106*a-b*, 106*c-d*, and 106*e-f*, respectively. String 40*b* is supported at a higher position than 40*a*. String 40*c* is supported at a lower position than string 40*a*. These heights correspond to the projectile trajectory path 2 for a rifle (shown in FIG. 6B). For example, string 40*a* is supported at 5 feet, string 40*b* is supported at 5½ feet, and string 40*c* is supported at 3½ feet. At these different heights the AI device 10 can better recognize the wind effect on the bullet, e.g., along projectile trajectory path 2 for a rifle (shown in FIG. 6B).

With preferred embodiments using banded rods, the AI device is better able to detect the rods and their height. For example, in this example, 5 feet (see FIG. 8A), 5½ feet (FIG. 8A combined with FIG. 8D), and 3½ feet (FIG. 8B combined with FIG. 8D), respectively.

FIG. 7B shows two strings 40*a* and 40*b*, respectively, support by pairs of rods 106, 106*a-b* and 106*c-d*, respectively. String 40*a* is supported at a higher position along a relative longer segment.

FIG. 7C shows two strings 40*a* and 40*b*, respectively, support by pairs of rods 106, 106*a-b* and 106*c-d*, respectively. String 40*b* is supported at a higher position near the vertex. String 40*a* would help detect the initial wind impact on the path. String 40*b* would detect the wind impact at the higher part of the path.

Flexible Rods and Extensions

As shown in the previous figures, it is advantageous to have rods 106 of different lengths. FIGS. 8A through 8D illustrates a flexible rod 106 and extensions 199*b*, preferable marked with dark bands 802 and light bands 804.

Figures 8A, 8B, 8C, 8D:
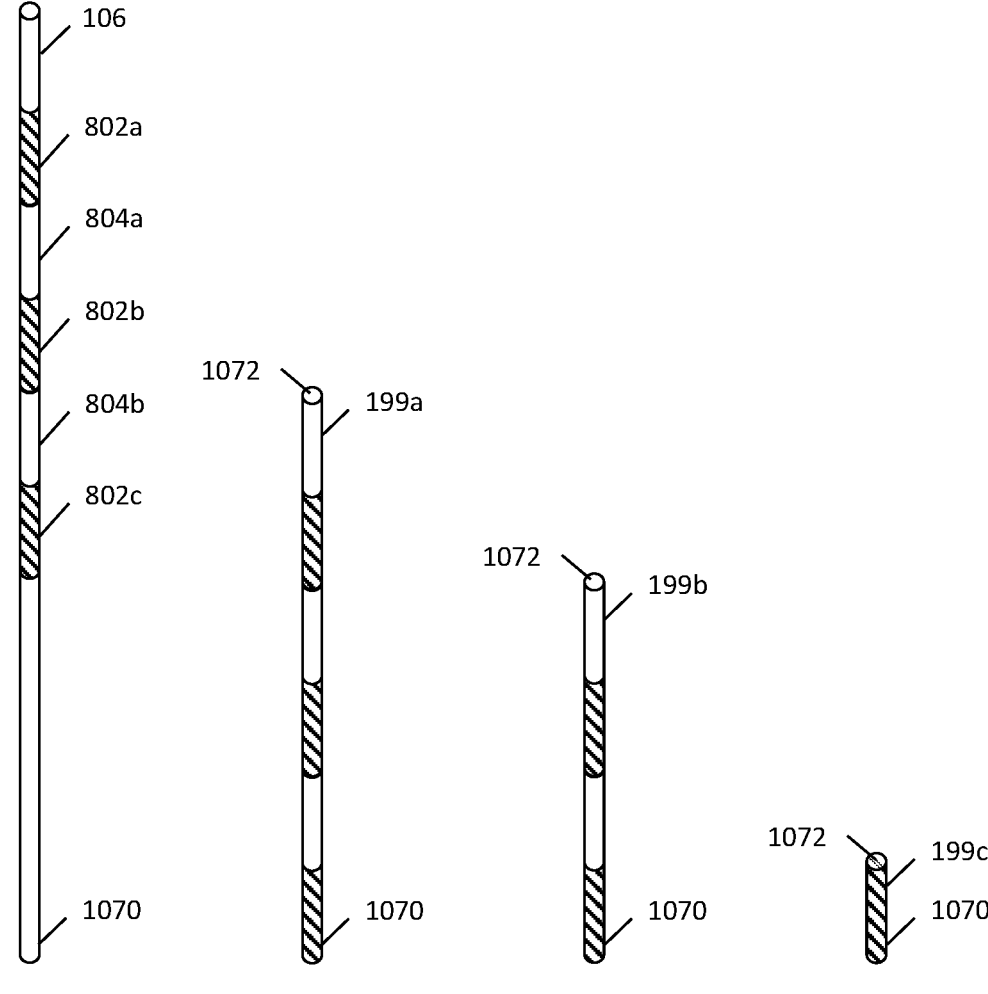
FIGS. 8A through 8D illustrate a flexible rod and extensions, preferable marked with dark and light bands.

FIG. 8A illustrates a flexible rod 106, preferable marked with dark bands 802 and light bands 804. Dark bands 802*a*, 802*b*, and 802*c* are preferably 6-inches long and are separated by 6-inch long light bands 804*a* and 804*b*. In this preferred embodiment the rod is 5 feet long, and the 3 feet are easily identified at the bottom of each dark band 802, namely, 1 foot at the bottom of 802*a*, 2 feet at the bottom of 802*b*, and 3 feet at the bottom of 802*c*. The bottom of the rod 106 is an inserting end 1070.

The dark bands 802 and light bands 804 of a predetermined length aid the AI device is detecting the location and flex of the rod 106. Further, the AI device determines the distance from the AI device to each rod 106 and determines length of the string based on the distance between the near rod 106*a* and the far rod 106*b*. While not required, the dark bands 802 and light bands 804 enhance the captured images 36 and improve the rod 106 and string 40 recognition, detection, and alignment.

FIG. 8B illustrates a 3-foot rod extension 199*a*, preferable marked with dark bands 802 and light bands 804.

FIG. 8C illustrates a 2-foot rod extension 199*b*, preferable marked with dark bands 802 and light bands 804.

FIG. 8D illustrates a 6-inch rod extension 199*b*, preferable marked with a dark band 802.

The bottom of each rod extension 199 is an inserting end 1070.

The different rod 106 and rod extension 199*a* through 199*c* sizes provide for configuration of support rods 106 of different lengths. However, the rod can be broken down and carried in a smaller bag. A 5-foot rod 106 is configured from a 3-foot extension 199*a* and 2-foot extension 199*b*. All three extensions 199*a-c* could be configured for the 5½ foot support needed to place a wind sensor 680 at P100 in FIG. 6B.

Figures 9A, 9B:
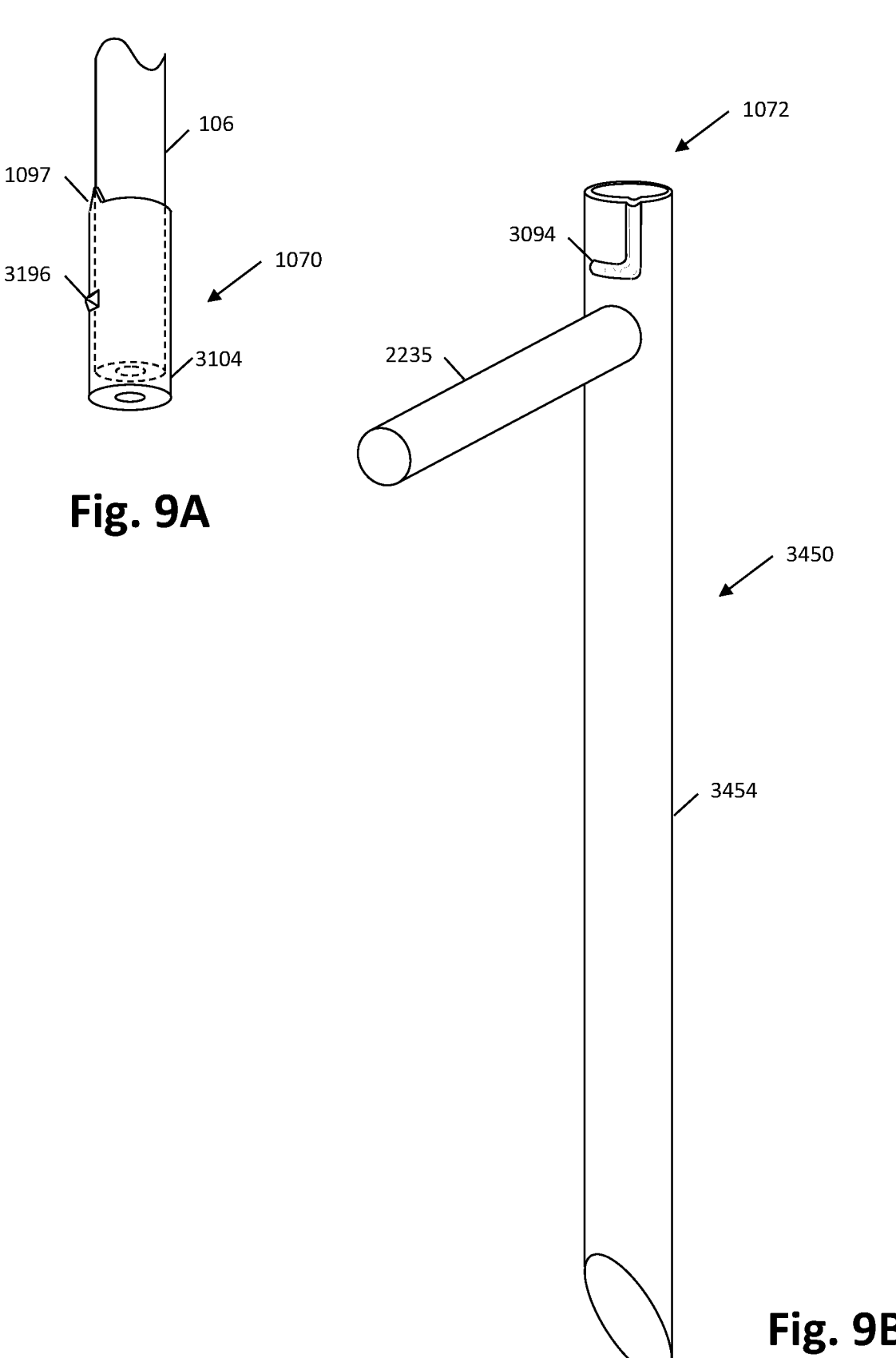
FIGS. 9A and 9B illustrate lockable inserting ends and receiving ends for embodiments of the flexible rod and extensions, and FIG. 9B further illustrates a ground stake for supporting the rod assembly.

FIGS. 9A and 9B illustrates lockable inserting ends 1070 and receiving ends 1072 for embodiments of the flexible rod and extensions. FIG. 9B further illustrates a ground stake 3450 for supporting any rod assembly (comprising rod 106 and extensions 199).

Our U.S. Pat. Nos. 7,841,355 and 8,789,550 disclose sleeve 3104 having an outward protrusion 3195 and protrusion indicator 1097, shown on the inserting end 1070 in FIG.

9A, and a locking channel 3094 on the receiving end 1072 and a ground stake 3450 as shown in FIG. 9B.

The ground stake 3450, in addition to the locking receiving end 1072, comprises a pointed stake member 3454 for insertion into the ground, and a horizontal leg 2235 which aids ground insertion and removal. For example, a user steps on the horizontal leg when placing the rod 106 in the ground.

Each of the inserting ends 1070 rod 106 and rod extension 199*a* through 199*c* can be inserted and locked into any of the receiving ends 1072 of rod extensions 199 and the ground stake 3450, to configure a flexible rod 106 which can be removably placed in the ground.

Deep Learning Model Use and Operation

FIGS. 10A through 10F illustrates the use and operation of the AI device 10.

Figures 10A, 10B, 10C, 10D, 10E, 10F:
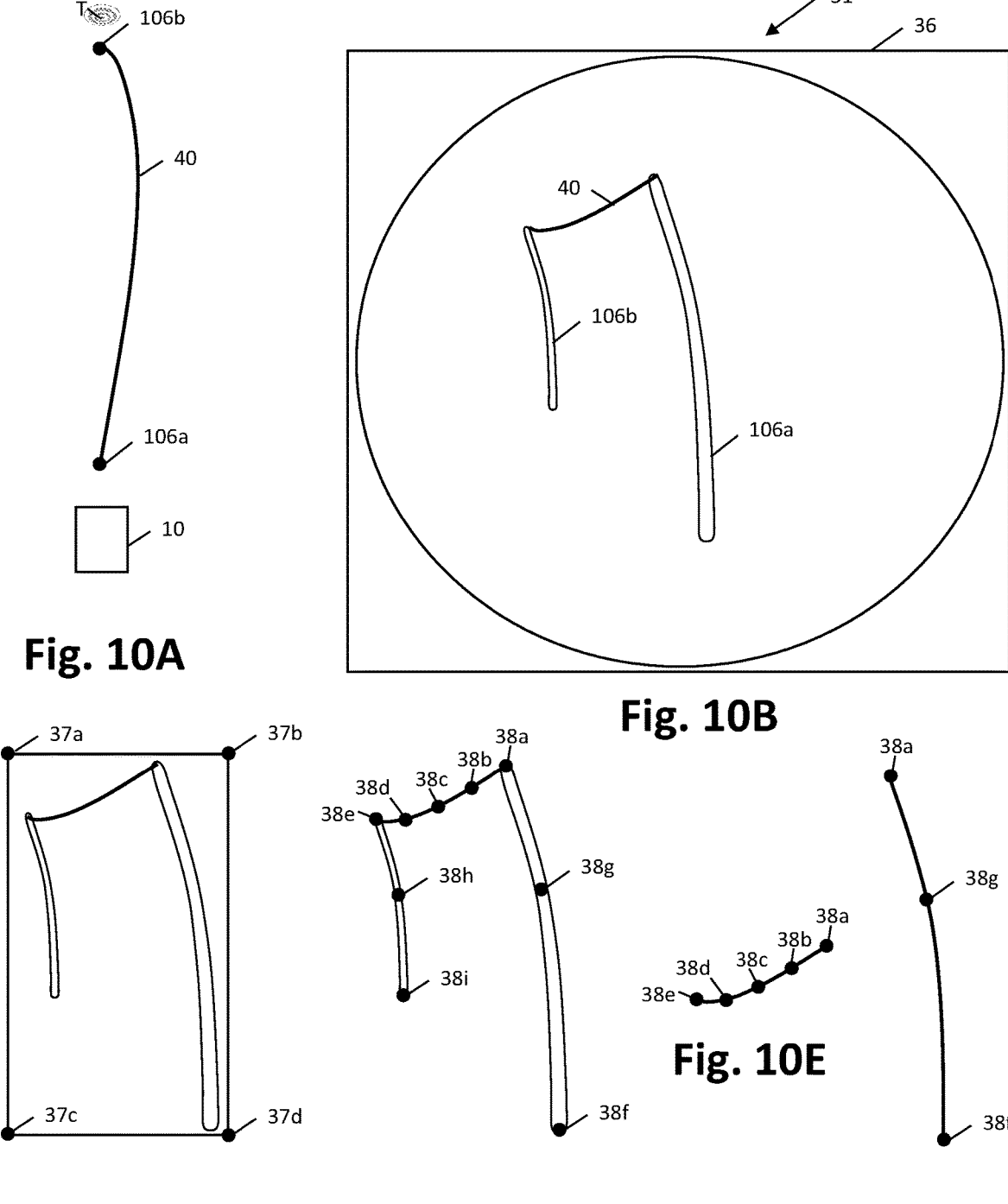
FIGS. 10A through 10F illustrate the use and operation of the AI device.

FIG. 10A illustrates positioning the AI device 10, flexible rods 106*a* and 106*b*, and the string 40 along a projectile trajectory path to a target. The AI device should be positioned about six feet from the near rod 106*a* with a full view of the string 400 and both rods 106*a* and 106*b*.

This is the positioning step.

FIG. 10B illustrates an image 36 captured by the AI device 10. The image is displayed on a high-resolution display 31, showing the shape and position of the string 40. The image 36 also shows the flex and relative positions of the flexible rods 106*a* and 106*b*, which also mark the ends of the string 40. This is the capture step.

FIG. 10C illustrates a detection crop from the image 36 with four bounding points 37 forming a bounding rectangle containing the cropped image of the string 40 and rods 106, which is cropped from the image 36 of FIG. 10B. This is the first part of the detection step.

FIG. 10D illustrates fiducial points 38 found on the string and rods of the cropped image of FIG. 10C. Fiducial points 38*a* through 38*e* mark the curve of the string in the cropped image. Fiducial points 38*a* and 38*f* mark the ends of the near rod in the cropped image. Fiducial points 38*e* and 38*i* mark the ends of the far rod in the cropped image. Fiducial points 38*a*, 38*g*, and 38*f* mark the curve of the near rod. Fiducial points 38*e*, 38*h*, and 38*i* mark the curve of the far rod. Determining the fiducial points 38 is the second part of the detection step. The tar weight of the string plus the collective force of the wind against the string pull the rods toward each other, such that the direction of the flex of the rod is parallel with the string. A pulley near the near rod allows the direction flex of the rod 106*a* to be rotated, e.g., 90 degrees, such that the same camera captures the shape of the string 40 and the flex of the near rod 106 in the same image (not shown).

Knowing the focal magnification of the image, and preferably using the dark band 802 and light bands 804 visualized in the captured image, the computing element 16 (FIG. 3 and FIG. 4) can determine the distance of the near rod 106*a* from the image sensor 25, the distance from the near rod 106*a* to the far rod 106*b* which is the same as the length of the string 40, and the length of the rods 106. Later, the alignment step uses these length and distances to scale the cropped image.

The distance of the near rod 106*a* from the image sensor 25 optionally is an input to the deep learning model.

In another embodiment the AI device 10 measures the height of the portion of the near rod 106*a* (e.g., by using the bottom of the dark bands 802*a*, 802*b*, 802*c*) in pixels, and determines the distance from the camera to the near rod 106*a*.

The distance from the near rod 106*a* to the far rod 106*b* provides information regarding the tar weight of the string, which may be an input to the deep learning model, and an input to the trained model when determining the wind direction and speed.

FIG. 10E illustrates fiducial points 38 defining the shape and position of the string (in this case 38a through 38e).

FIG. 10F illustrates fiducial points 38 defining the flex of a flexible rod (in this case 38a, 38g, and 38h showing the curve of the near rod 106a.

Next in the alignment step, the cropped image scaled to a standard size. The length of the near rod is used as the standard for scaling. Thus, the user can place the AI device 10 at any reasonable distance from the near rod 106a. This removes the need for the user to measure the placement for accuracy of the deep learning model.

DeepFace teaches that near 100% face recognition can be achieved with both 2D rotation and 3D alignment. Alignment is optional. In our preferred embodiment, 3D alignment using the fiducial points 38, as well as determined lengths and distances, is used to align the top of both rods 106a and 106b in the center of the aligned image such that the flex of both rods and the entire string 40 curve(s) are visualized in the aligned image. This removes the need for the user to worry about the height or exact placement of the AI device 10 when capturing images.

These comprise the alignment step. The alignment is applied by transforming the fiducial points. After the fiducial points have been aligned, the image pixels are no longer needed, The cropped, scaled, 2D aligned, and optionally 3D aligned fiducial points for each of a multiplicity of images 36, as well as the wind sensor information captured at the same time as the image, are given as inputs to the deep neural networks (DNN). Optionally, a concurrent sound recording is converted to a spectrogram and the spectrogram fiducial contours are given as an input to the DNN.

The DNN is trained on the wind recognition task with a goal of output a wind direction and speed in relation to the directional alignment of the bottom of each rod 106 (which represents the direction of the target T. In a currently preferred embodiment, there is no need to visualize or detect the target itself. This simplifies the parameters of the DNN.

In simple terms, the DNN is used to classify the multiplicity of images 36 to a particular crosswind class (and optionally headwind/tailwind class). Once trained the AI device 10 can classify a single new image and/or sound, and output a particular crosswind and tailwind based on a matching class. See operation below.

In practice, a very small percentage of shots need to be taken in winds greater than 30 m.p.h. (miles per hour). Thus, the ability to identify 60 distinct classes for cross wind (e.g., 30 from left cross winds from 0 to 30 m.p.h. and 30 for right cross winds from 0 to 30 m.p.h.) should be sufficient for general hunting or target shooting applications. Our model thus is less complex, smaller, and faster than the DeepFace model.

DeepFace also teaches that the number of layers in the DNN can be varied to simplify or to enhance the error rates. Accordingly, one skilled in the arts of computer vision and machine learning, and in particular DNN-based image classification would be able to modify the DNN to meet their particular needs and parameters of their product (such as process speed, memory size, battery life, etc.).

In one embodiment of the DNN, only the string fiducial points 38 are used. In another embodiment of the DNN only the rod fiducial points 38 are used. In yet another embodiment only the near rod fiducial points and the sound fiducial contours are used. To be clear, each input is labeled with sensed wind values from one or more wind sensors 860.

In yet other embodiment, the strings 40 and rods 106 are positioned at an angle such as a 90 degree angle from each other.

Figures 11A, 11B:
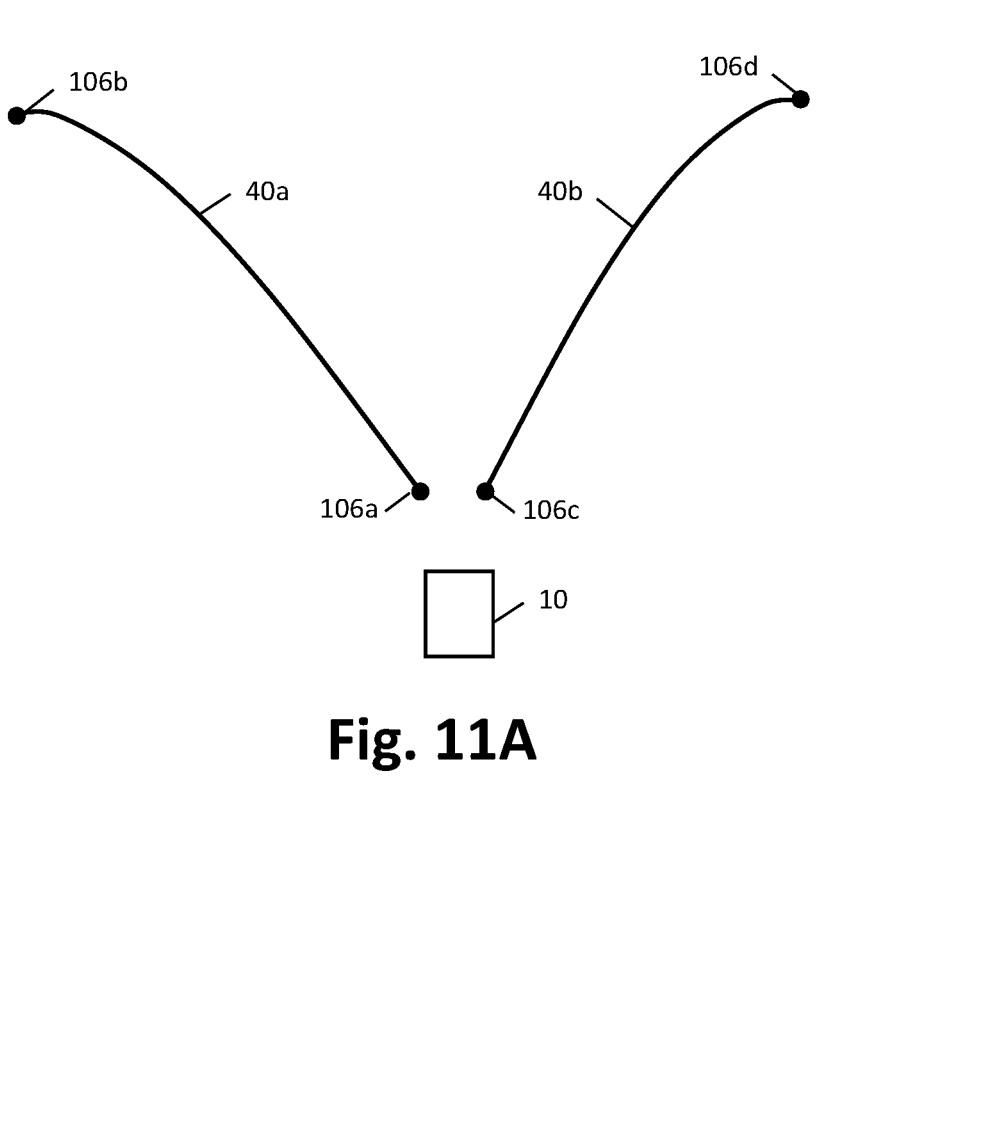
FIGS. 11A and 11B illustrates a plurality of strings, each positioned at different angles relative to the projectile trajectory path to the target.

FIGS. 11A and 11B illustrate a plurality of strings 40, each positioned at different angles relative to the projectile trajectory path to the target T;

FIG. 11A illustrates a left string 40a supported by rods 106a and 106b generally angled 45 degrees to the left of the target T, and a right string 40b supported by rods 106c and 106d generally angled 45 degrees to the right of the target T, such that the strings 40a and 40b generally form a 90 degree angle.

FIG. 11B illustrates a string 40a supported by rods 106a and 106b generally angled along the projectile trajectory path to the target T, and a tailwind string 40b supported by rods 106c and 106d generally angled 90 degrees generally on a line perpendicular to the target T, such that the strings 40a and 40b generally form a 90 degree angle. String 40b is much shorter than string 40a, as its role is to measure headwind and tailwind relative at the origin of the shot, and so it is more easily visualized in the field of view of the AI device 10. The embodiment shown in FIG. 11B is currently preferred over the model shown in FIG. 10A when headwind/tailwind output is desired from the DNN.

Field Use and Operation of the Trained AI Device

Figure 12:
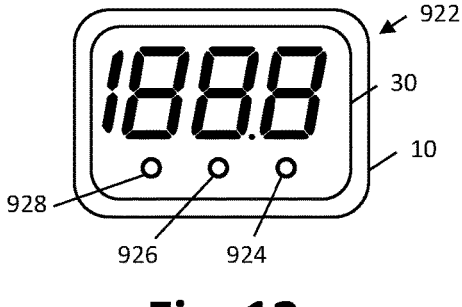
FIG. 12 illustrates a display with indication of the crosswind speed relative to the path to the desired target, and indicators of a predicted steady state of optimum wind.

FIG. 12 shows an embodiment of display 30 as shown for example on the form factor of the AI device 10 shown in FIG. 4. This embodiment does not require a high-resolution display 31 (for example, as shown in FIG. 10B, FIGS. 15A through 15C, or FIG. 16). This embodiment of AI device 10 may be carried by hand or mounted in a fixed position, such as on a tripod at a shooting range or on a tree stand or in a hunting blind. Under one setting it operates automatically to periodically display crosswind information, in a crosswind indicator 922, and, optionally, display the state of a steady optimum wind condition by illuminating at green indicator 924. A yellow indicator 926 indicates that the optimum wind condition is approaching. The red indicator 928 indicates that the wind is too strong or unpredictable at the moment.

FIG. 13 illustrates crosswind and tailwind vector elements of wind 48, namely crosswind vector 52 is the crosswind element and tailwind vector 56 is the tailwind vector which is in the negative director for headwind.

Figure 14A:
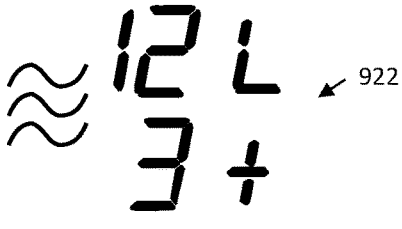
FIGS. 14A through 14B illustrate embodiments of display elements with crosswind speed and direction indicators and with headwind/tailwind speed indicator.
Figure 14B:
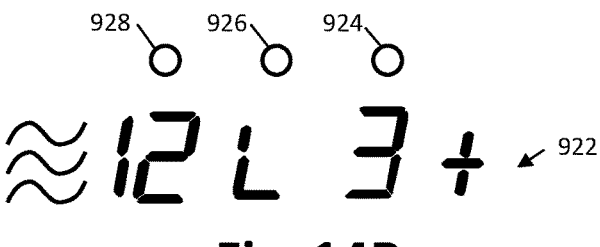

FIGS. 14A through 14B illustrate embodiments of display 30 or high-resolution display 31 elements with crosswind speed indicators and with headwind/tailwind speed indicators as part of crosswind indicator 922. A wind icon is shown as three waves as a visual clue to the viewer. As shown the current crosswind has been recognized as 12 m.p.h. moving to the left as indicated by "12 L" and there is a 3-mph tailwind as indicated by the plus sign in "3+". FIG. 14B further includes indicators of a steady state of optimum wind, namely the green indicator 924, yellow indicator 926, and red indicator 928, as described above.

FIGS. 14A through 14B are based on the crosswind vector 52 and tailwind vector 56 in relation to the wind 48 relative to the path to the targets (see FIG. 13).

The handheld portable use and operation of trained AI device 10 is now discussed in more detail.

In operation, the user aligns AI device 10 with the target T and views the target T on the display 30. The AI device 10 may provide generally conventional optical functionality, such as magnification or other optical modification, by utilizing a lens 24 and/or the computing element 16. Preferably, the device 10 provides an increased field of vision as compared to conventional riflescopes to facilitate conventional view functionality. The focal magnification typically is 4×, 5×, 7×, 12× and so forth. In some embodiments the magnification factor is variable, such as with a zoom feature. This magnification value is used by the computing element 16 in performing the mapping of the various indicators, and operating the deep learning model on the captured image is discussed in reference to FIGS. 10A through 10F above.

Further, the user may function the inputs 32 to control the operation of AI device 10. For example, the user may activate AI device 10, provide configuration information, and/or turn on or off automatic operation, or manually initiate a capture and recognition sequence by functioning one or more of the inputs 32.

High-Resolution Display Use and Operation

Figures 15A, 15B:
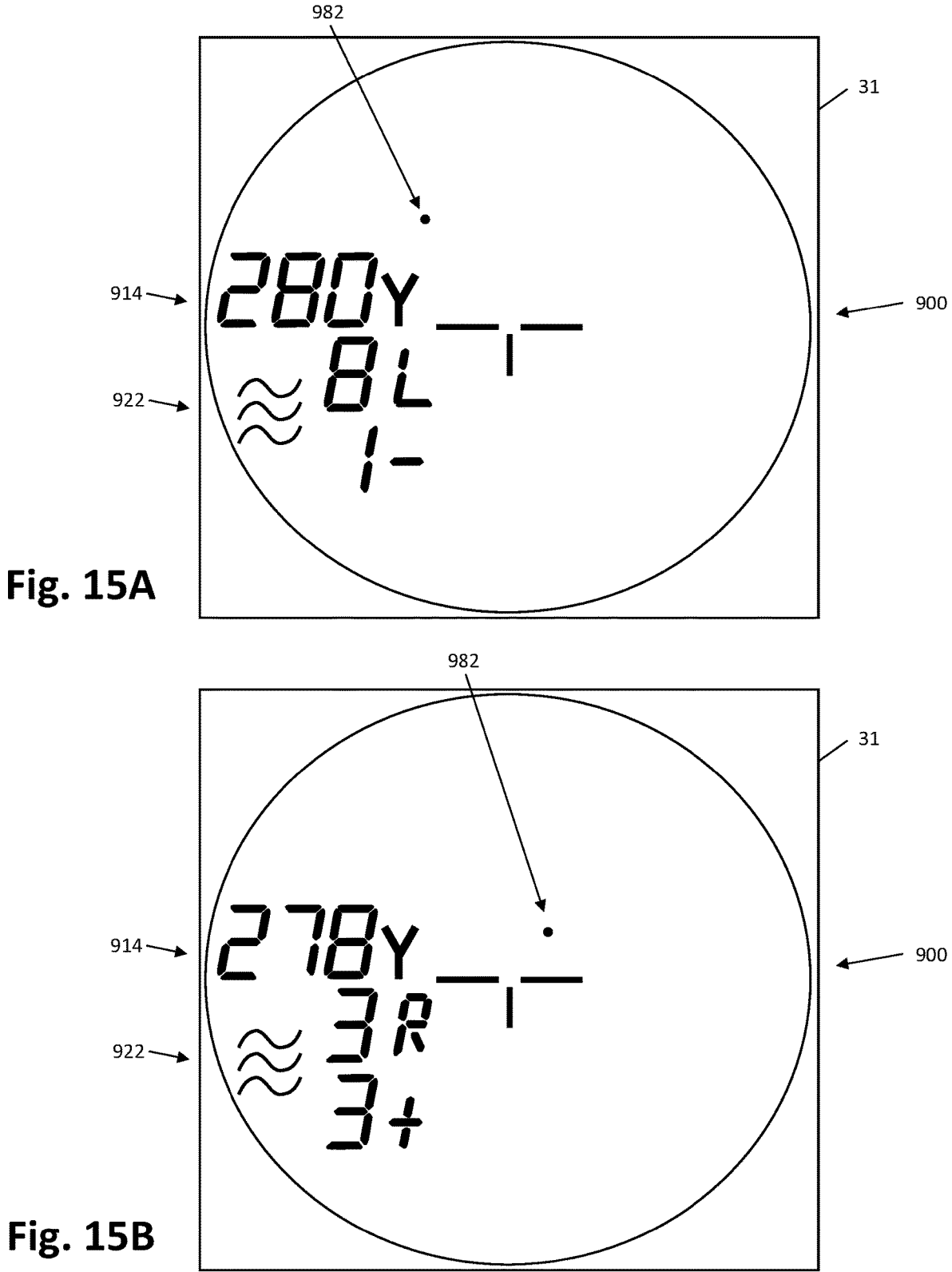
FIGS. 15A through 15C illustrate a display with indication of the crosswind speed and direction and headwind/tailwind speed, each relative to the path to the desired target, indicators of a steady state of optimum wind, and an adjusted aiming point, the aiming point adjusted for crosswind and range adjusted for tailwind/headwind.

FIGS. 15A through 15B illustrate a high-resolution display 31 showing an aiming point 982 based on a projectile trajectory path adjusted for wind using the deep learning model of the present invention. The crosshairs 900 are used to aim the AI device 10 towards the target, providing an input to the deep learning model the direction of the line of sight to the target. It also displays the captured image for recognizing current wind (as shown in FIG. 10B.

FIGS. 15A and 15B each shows a high-resolution display 31 providing digital video superimposed with horizontal distance indicator 914, crosswind indicator 922, and adjusted aiming point 982. The adjusted aiming point 982, in this embodiment, doubles as the green indicator 924.

FIG. 15A shows an output from the deep learning model. There is an 8-mph cross wind moving left and a 1-mph headwind. The user is guided to shoot for 280 yards at the dynamically moving adjusted aiming point 982 when it turns green.

FIG. 15B shows an output from the deep learning model after the wind has shifted. There is a 3-mph cross wind moving right and a 3-mph tailwind. Accordingly, the user is guided to shoot for a shorter distance of 278 yards at the dynamically moving adjusted aiming point 982 when it turns green.

Figure 15C:
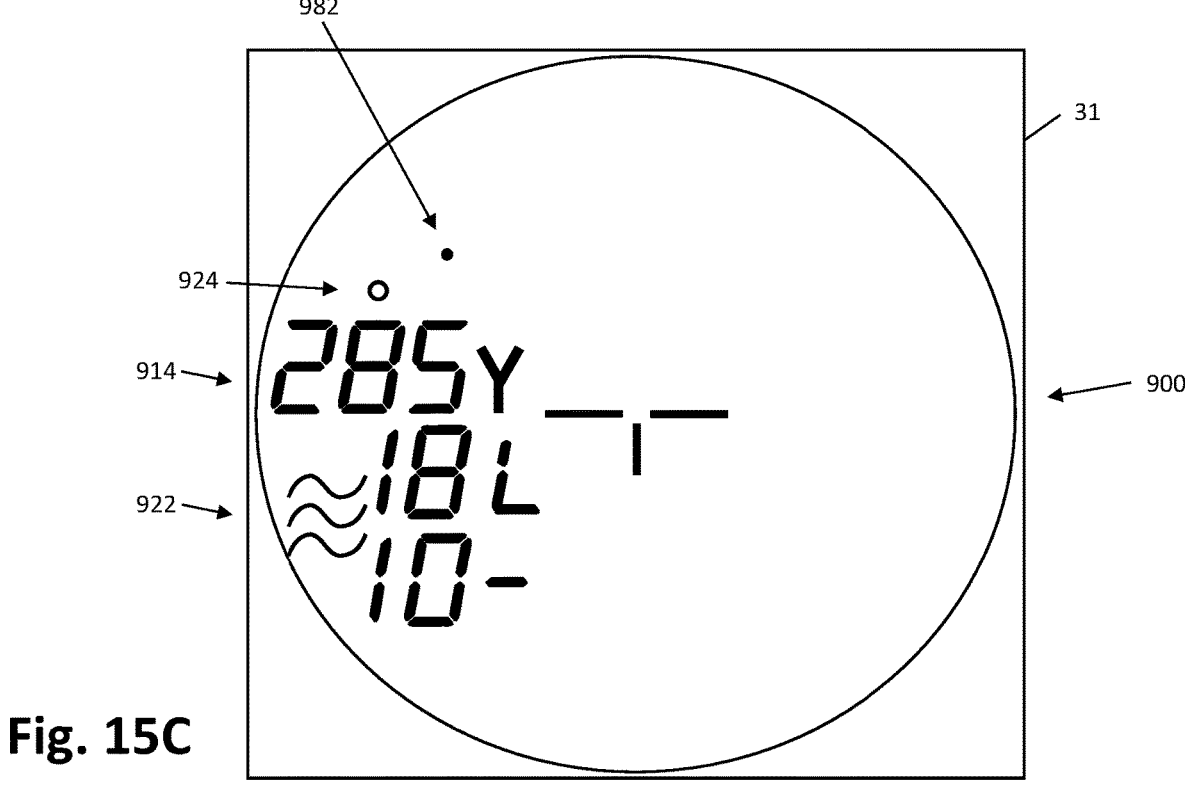

FIG. 15C shows yet another embodiment where green indicator 924 is in a permanent position near the center of the user's field of vision. The wind is much stronger. There is an 18-mph cross wind moving left and a 10-mph headwind. Accordingly, the user is guided to shoot for a longer distance of 285 yards at the dynamically moving adjusted aiming point 982, when the separate green indicator 924 is illuminated.

See discussion of FIG. 27 below.

High-Resolution Digital Display

Figure 16:
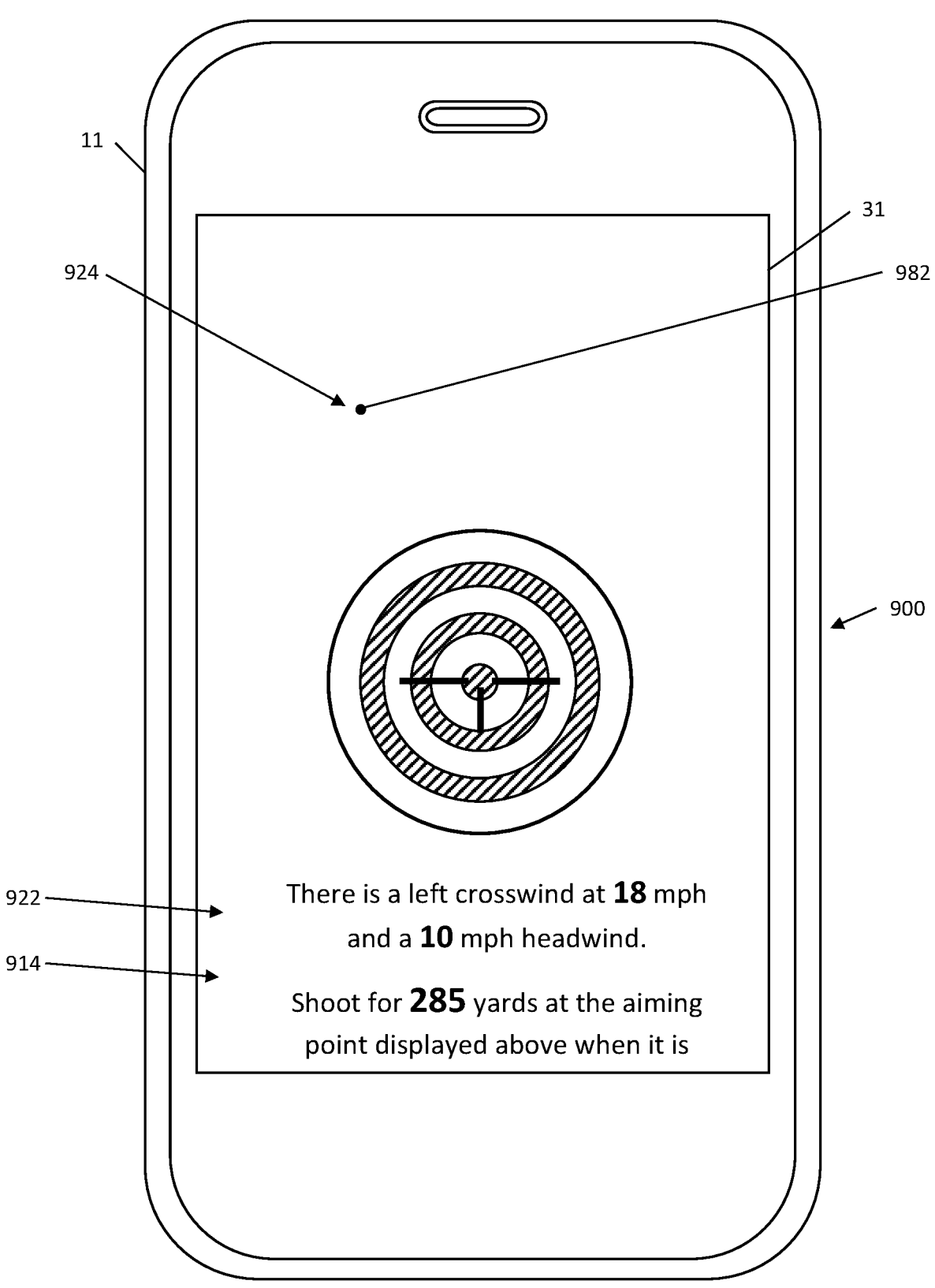
FIG. 16 shows a high-resolution digital display, such as on an iPhone, providing indication of the crosswind speed and direction and headwind/tailwind speed, indicators of a steady state of optimum wind, and an adjusted aiming point, the aiming point adjusted for crosswind and range adjusted for tailwind/headwind.

FIG. 16 shows a high-resolution display 31 providing digital video superimposed with horizontal distance indicator 914, crosswind indicator 922, and adjusted aiming point 982. The adjusted aiming point 982, in this embodiment, can double as the green indicator 924. This embodiment has very simple use for the operator, for example, the text on the screen simply states, "There is a left crosswind at 18 m.p.h. and a 10 m.p.h. headwind. Shoot for 285 yards at the aiming point displayed above when it is green," or even simpler "Aim at the dot and shot when it turns green."

This simple embodiment is an example of our best mode embodiment which we intend to market under the Aim-Finder™ trademark.

FIG. 16 shows a digital, high-resolution display 31, in this example, a touch screen display of an Apple iphone 11.

One advantage of a digital, high-resolution display 31 is that it is not limited to the circular optical focus area. The additional area of the rectangular display can be used for various purposes. Information can be moved outside the circular focus area, for example, to the lower corners and bottom of the screen. This has the advantage of allowing the circular focus area to be less cluttered and to obscure less of the optical image information. Further, the rectangular high-resolution display 31 can provide more optical information.

Another advantage of a high-resolution display 31 is that the overlay information is produced by software rather than by a hardware chip. Custom hardware chips can be expensive to design and manufacture and are less flexible. The overlay information generated by software for display on the high-resolution display 31 is higher quality, such as easier to read fonts, and move flexible, such as being able to display in different colors or locations of the screen to avoid obscuring the optical information being overlaid. The display can have more options, such as natural languages, different number systems such as Chinese, different units of measure, and so forth. Further, the software can be easily updated to incorporate new features, to improve calculations, or to support addition projectile information. Updates can be made in the field as well as in new models at a lower cost. For example, in some embodiments, new software can be downloaded over the Internet.

High-Resolution Touch Screen Display

FIG. 16 also shows an exemplary touch screen display as an embodiment of the high-resolution display 31. The high-resolution display 31 displays the video image as digitally captured by the digital camera 25 (see FIGS. 3 and 4).

The embodiment shown comprises a mobile smart phone, in particular an Apple iPhone 11. Correlating FIG. 3 and FIG. 20 with FIG. 16, the computing element 16 is the processor of the iPhone 11; the memory 18 is the memory of the iphone 11; a 9-axis sensor 15 is the 3-axis magnetic compass, 3-axis gyroscope, and 3-axis accelerometer of the iPhone 11; and the display 30 is the touch screen display of the iPhone 11, an embodiment of the high-resolution display 31.

Digital AI Devices

Figure 17:
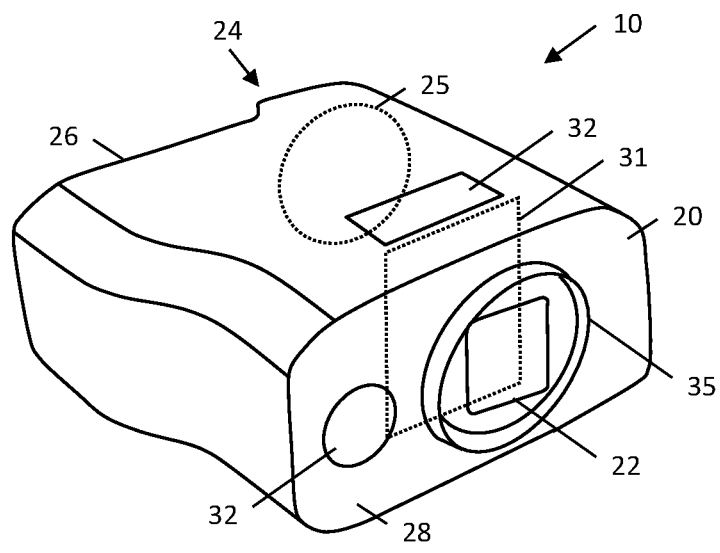
FIG. 17 is a rear perspective view of a digital rangefinder device.
Figure 18:
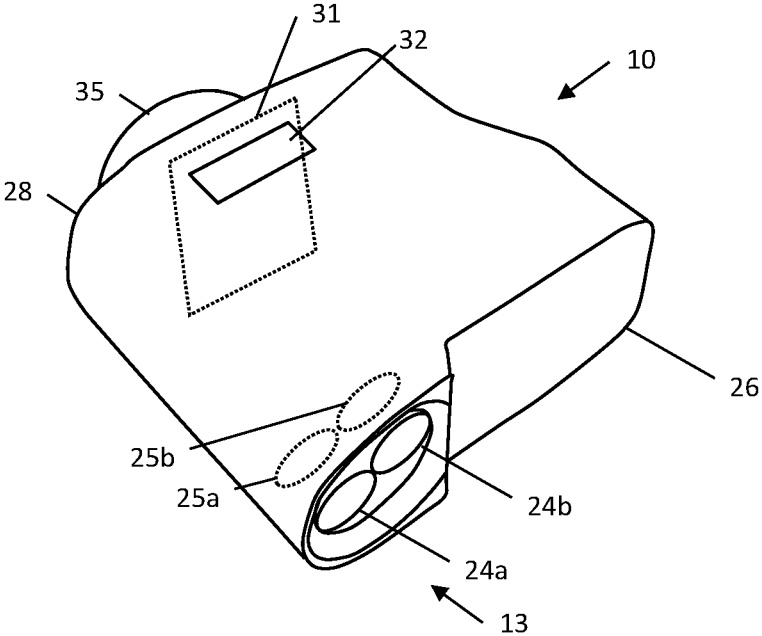
FIG. 18 is a front perspective view of the rangefinder device of FIG. 17.

FIGS. 17 and 18 are rear and front perspective views, respectively, of digital embodiments of AI device 10.

The digital AI device 10 comprise a housing 20, having an eyepiece 22 at the proximate end 28, a lens 24, an optional range sensor 12 (not shown), and inputs 32 in various places on exterior. In contrast to the conventional rangefinder, the housing 20 contains an image sensor (digital camera) 25 that captures and digitizes video from the optical image through the lens 24 and contains a digital, high-resolution display 31. The video comprises a series of image frames. The computing element 16 (FIG. 3) processes the image frames, overlays each frame with various indicators, and displays the resulting image on the high-resolution display 31. Further, the high-resolution display 31 is controlled completely by the computing element 16 (FIG. 3) and need not display any of the optical image being captured; instead, the high-resolution display 31 may display setup menus, recorded video, or annotations generated by the computing element 16 (FIG. 3).

FIG. 17 shows at least one lens 24 and at least on image sensor 25.

FIG. 18 shows an embodiment with two lens 24, namely, a low magnification lens 24a and a high magnification lens 24b; and two digital camera image sensors 25, namely, a low magnification image sensor 25a and a high magnification, preferably higher resolution, image sensor 26b. The low magnification lens 24a is in the range between 4× and 12×. The high magnification lens 24b is in a range greater that 20×, and preferrable would provide pixel detail of a target object at a distance between 400 yards and 1000 yards.

The eyepiece 22 may also be modified to accommodate viewing of the high-resolution display 31. In particular, the eyepiece 22 may be inset and be protected by a shroud 35.

Smartphone based embodiments are discussed below regarding FIGS. 25 and 26.

In contrast to the conventional rangefinder housing 20 as shown in FIGS. 14 and 15, the housing 20 of the digital rangefinder of FIGS. 17 and 18 is more compact, more lightweight, and easier to transport and use, due to removal of the end-to-end optics, and the optional removal of the laser related electronic components and lenses. For example, the length between the proximate end 28 and the distal end 26 is shown as less than about four inches. The width and height could be about two inches, respectively.

AI Devices Comprising Mobile Smart Phones and Tablets

Figure 20:
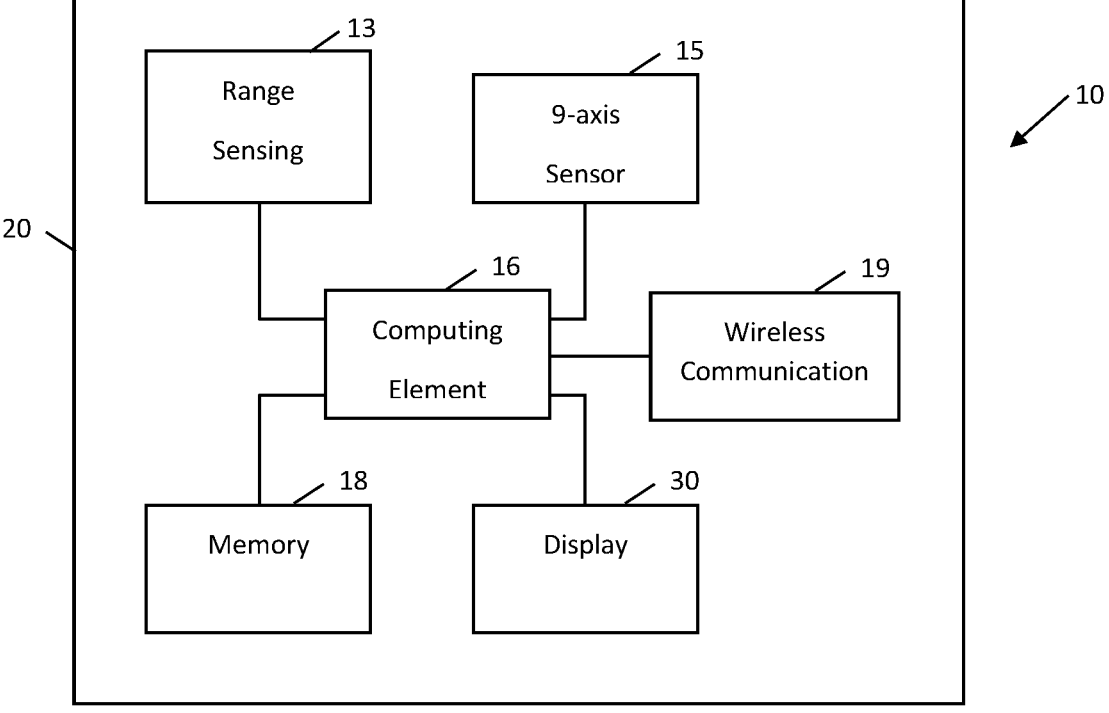
FIG. 20 is a block diagram of a laser-less, no emission range finding device.

In addition to the AI advantages of the present invention, embodiments comprising mobile smart devices, such as iPhone 11 or Android (e.g., Samsung, LG, Lenovo, Amazon, etc.) have several advantages over conventional rangefinders. First, the user has one less item to carry this reduces the overall weight and complexity. Second the range finding device has a lower incremental cost to manufacture, being just the alternate housing 21 and the range sensing means 13 (FIG. 20). The processor (computing element 16), 9-axis sensor 15, digital camera 25, high-resolution display 31, and inputs 32 (including touch screen display inputs 34) of the mobile smart device is used to provide the necessary components of the digital rangefinder device 10. Third, the mobile smart device, such as iPhone 11, has other useful features such as global positioning system (GPS), virtual maps, satellite images, emergency communications, video capture, video playback, digital photographs, etc.

Advantages of mobile smart device are explained with an exemplary scenario. The user uses the GPS and satellite images to travel to a hunting spot identified on a previous trip; however, the topographical maps and satellite images allowed the user to find a more direct, shorter route. A group of targets are in thick brush. Zoom video is taken showing the details of the targets such as which are does and bucks, number of points on the antlers, size of the animals. The dynamic clear shot trajectory mode is used to identify potential obstacles and to position the user and the weapon for a clear shot. The photo is marked with the GPS coordinates and time. The photo image may be uploaded to the deep learning training dataset. A second video is captured showing an animated projectile trajectory 2 path from a straight view (such as discussed in reference to FIGS. 28 and 29). The motion sensors of the iphone 11 are used to determine any projectile inertia. A third video is captured showing the animated projectile trajectory 2 path from a side perspective view. The firing device is aimed based on the information provided by AI device 10. When the projectile is fired, a fourth video is captured showing the actual projectile trajectory 2 and the success of failure of the shot. The success of the AI device prediction is scored. If Internet access is available via WiFi or via cellular wireless, the photo and videos can be uploaded to friends, video producers, or social networking sites, as well as deep learning training dataset. Any of the videos can be replayed.

In yet another more sophisticated embodiment of a very smart rangefinder device 10, an analysis of the second video can be compared to an analysis of the fourth video and AI device 10 can automatically recalibrate to match the true trajectory captured in the fourth video. The true parabola values, the air drag, and the crosswind drift can be determined and used for developing a training set for a future embodiment.

Complex Harsh Natural Environments

FIG. 19 illustrates a string 40 and flexible rods 106*a* and 106*b* placed in a harsh, rough environment with hills and valleys and strong winds at different speeds and directions along the projectile trajectory path. The terrain causes different wind represented by wind 48*a*, 48*b*, and 48*c*. Wind 48*a* is illustrated going up the near hill toward the target T. Wind 48*b* is shown as an opposing cross wind moving right along the valley and adjacent cliff. Wind 48*c* is shown with a right crosswind and a slight headwind from wind coming over the taller mount crest.

The reader will see that the fiducial points 38*a* through 38*h* is a more complex curve. Such a curve may be too difficult for a human to interpret in a short enough time to make an ethical shot. However, the present invention provides the possibility of rapid accurate analysis faster than a human.

Improved Laser-less, No Emission Range Finder

FIG. 20 illustrates our novel AI device 10 comprises a computing element 16, coupled with a range sensing means 13, a 9-axis sensor 15, a memory 18, wireless communications 19, and a display 30, which is preferably a high-resolution display 31. A housing 20 contains the elements of the device 10.

The 9-axis sensor 15 combines a 3-axis gyroscope, 3-axis accelerometer and 3-axis compass in the same chip together. The gyroscope provides immediate response to changes in orientation, but suffers from drift over time. The compass provides accurate magnetic direction but may be slow to respond and may be affected by aberrations in the magnetic field such as metal structures. The software running on the computing element 16 corrects for the deficiencies in each different 3-axis sensor. This is known as software fusion. These sensors provide information to the AI device 10 to make fine adjustments to the projectile trajectory.

In laser-less embodiments, the range sensing means 13 comprises one or more digital cameras 25 providing a magnified digital image 36 (e.g., FIG. 10B, FIG. 21A, and FIG. 21B) to the AI running in on the computing element 16 and using memory 18.

Determining Distance Between Rods

Figures 21A, 21B:
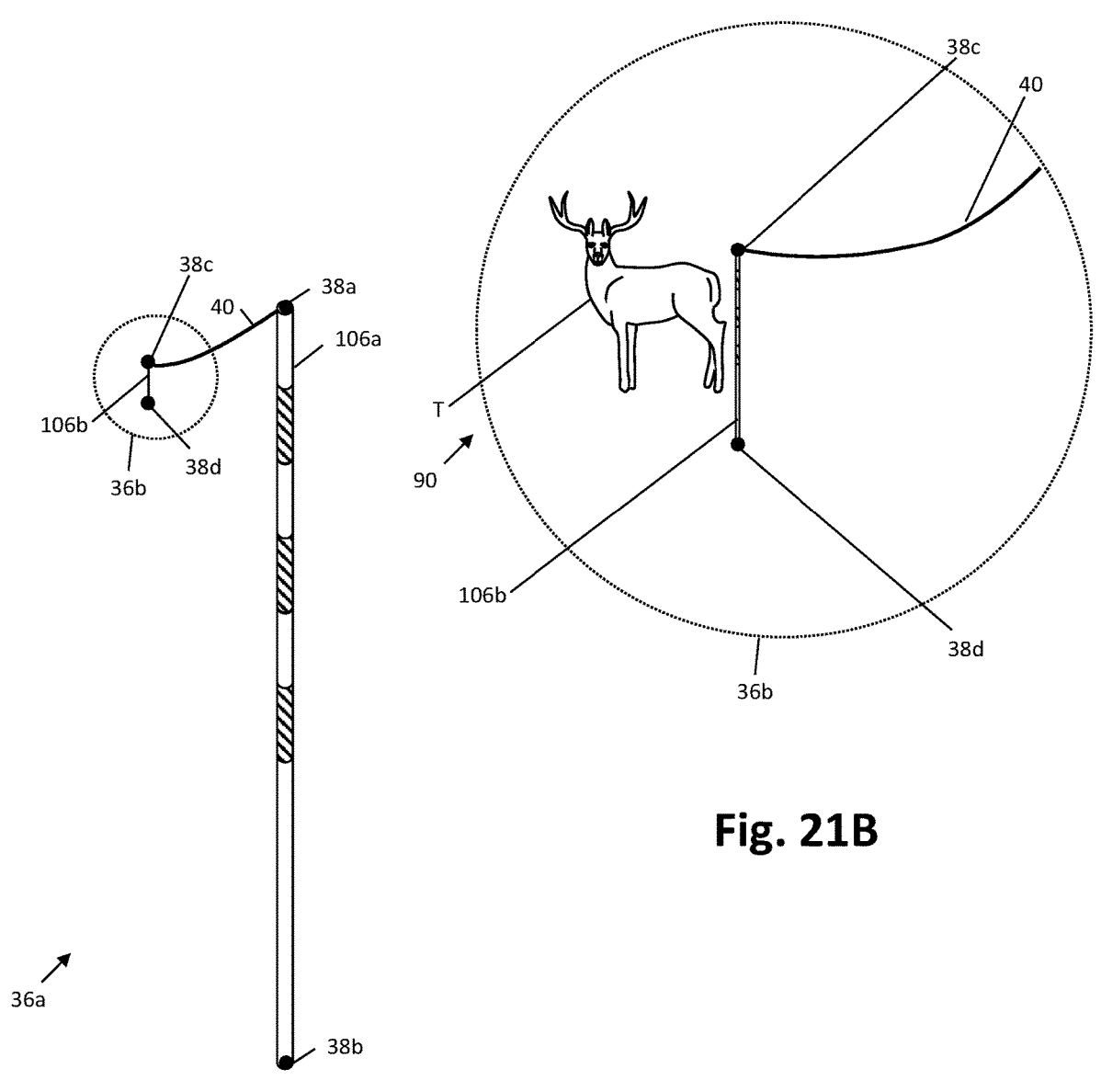
FIG. 21A illustrates a string and flexible rods showing the visually relative height of the rods.
FIG. 21B show a high magnification of the target in FIG. 21A.

FIG. 21A illustrates a string 40 and flexible rods 106*a* and 106*b*. In this illustration both rods are five feet tall. The near rod 106*a* is about 6 feet from the AI device 10. The far rod 106*b* is 80 yards past the near rod 106*a*. The string 40 is 80 yards long. The near rod 106*a* has been detected and is displayed with top fiducial point 38*a* and bottom fiducial point 38*b* measuring a size of 60 inches (5 feet) between the top and bottom of the rod. The far rod 106 has been detected and is displayed with top fiducial point 38*c* and bottom fiducial point 38*d* measuring a size of 60 inches (5 feet) between the top and bottom of the rod.

The distance between the rods, impacts the weight of the string and the images being analyzed to determine wind.

Low Magnification Aiming Image and High Magnification Recognition Image

In a preferred embodiment at least one digital camera 25*a* (FIG. 18) provides a low magnification image 36*a* (e.g., FIG. 21A and FIG. 24A) which aids the user in locating the desired target and aiming the device 10 crosshairs 914 (FIG. 24A) and another digital camera 25*b* (FIG. 18) provides a high magnification image 36*b* (FIG. 21B) which aids the AI device 10 in determining an accurate size by having greater pixel resolution in the image, As shown in FIG. 21B, more detail of the object being recognized for size are shown in the high magnification image 36*b*. In this example, the banding on the far rod 106*b* is better visualized. The AI device 10 can better determine the size by determining the number of pixels in each 6-inch band, as well as the entire 5-foot rod, and averaging the relative results. Further, in this example, the deer 90 target T which was lost in the fog in the low magnification image 36*a* is now visualized in the high magnification image 36*b*. The AI device can also recognize a height for the deer 90 based on its known back to brisket size of 17 inches, and can compare it to the known size of the 5-foot rod, to determine a more precise range to the target T.

Detecting Objects in an Image

FIGS. 22A through 22G show different detected objects. During initial detection, different objects in the image being analyzed are detected and four points defining a bounding rectangle containing each object are identified. The bounding rectangle is used to crop the image before further analysis and alignment.

Figures 22A, 22B, 22C, 22D, 22E:
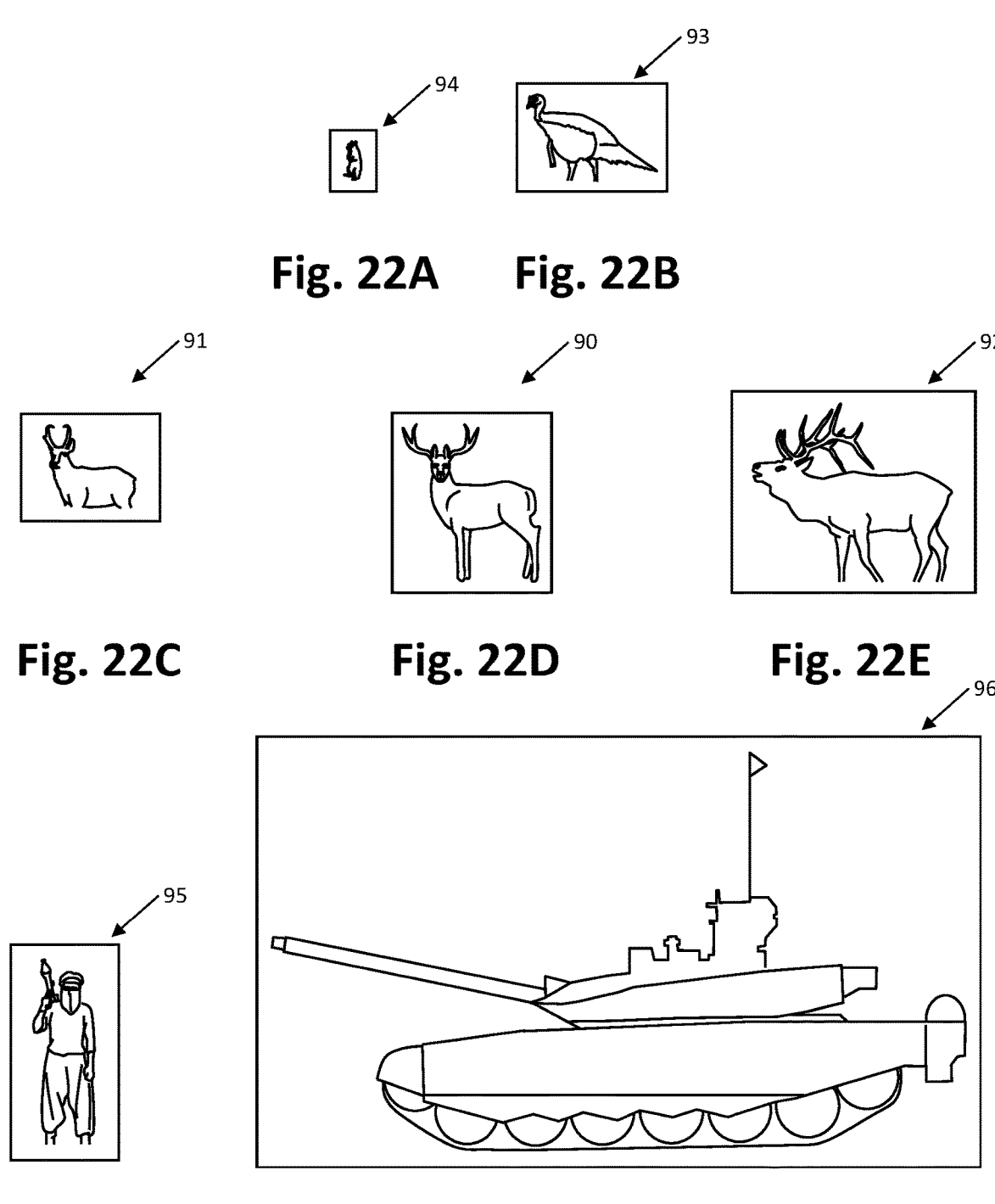

FIG. 22A shows a ground hog 94 detected and shown in a bounding rectangle.

FIG. 22B shows a turkey 93 detected and shown in a bounding rectangle.

FIG. 22C shows an antelope 91 detected and shown in a bounding rectangle.

FIG. 22D shows a deer 90 detected and shown in a bounding rectangle.

FIG. 22E shows an elk 92 detected and shown in a bounding rectangle.

FIG. 22F shows a man 95 detected and shown in a bounding rectangle.

FIG. 22G shows a tank 96 detected and shown in a bounding rectangle.

Using Known Sizes to Determine Distance

FIGS. 23A through 23G show the different detected objects (see FIGS. 22A through 22G, respectively). Each cropped image may be further analyzed to determine what kind of object it contains, e.g., a man; a vehicle, such as a truck or a tank; a four-legged mammal, such as a deer; a bird, such as a turkey, etc. Once the type of object is generally determined, fiducial points are identified that provide a measure, e.g., in pixels, of at least two points for that type of object. Each figure shows a height that is determined between a top fiducial point 38*a* and a bottom fiducial point 38*b*. The fiducial points may also be used to align the image. The cropped image may be analyzed further (as discussed below) to perform more specific identification of the object, such as the model of vehicle or the species, gender, and maturity of mammal.

FIG. 23A shows a ground hog 94 with top fiducial point 38*a* and bottom fiducial point 38*b* estimating a size of 16 inches between the top of the head and the feet.

FIG. 23B shows a turkey 93 with top fiducial point 38*a* and bottom fiducial point 38*b* estimating a size of 36 inches between the top of the head and the feet.

FIG. 23C shows an antelope 91 with top fiducial point 38*a* and bottom fiducial point 38*b* estimating a size of 15 inches between the top of the back and the bottom of the chest (or brisket).

FIG. 23D shows a deer 90 with top fiducial point 38*a* and bottom fiducial point 38*b* estimating a size of 17 inches between the top of the back and the bottom of the chest (or brisket).

FIG. 23E shows an elk 92 with top fiducial point 38*a* and bottom fiducial point 38*b* estimating a size of 27 inches between the top of the back and the bottom of the chest (or brisket).

FIG. 23F shows a man 95 with top fiducial point 38*a* and bottom fiducial point 38*b* estimating a size of 69 inches between the top of the head and the feet.

FIG. 23G shows a tank 96 with top fiducial point 38*a* and bottom fiducial point 38*b* estimating a size of 98 inches between the top of the turret and the bottom of the tread.

Each of these objects have a generally well know size. The AI device 10 is set with a known magnification for each input camera and lens and a pixel height and width for each image. The AI device 10 calculates a preliminary distance based on measured number of pixels in the image and the generally known size (e.g., 17 inches between the top of the back and the bottom of the chest).

Displaying a Determined Distance

Once the distance is determined, the preliminary distance is displayed numerically superimposed over the image from the camera.

Figures 24A, 24B:
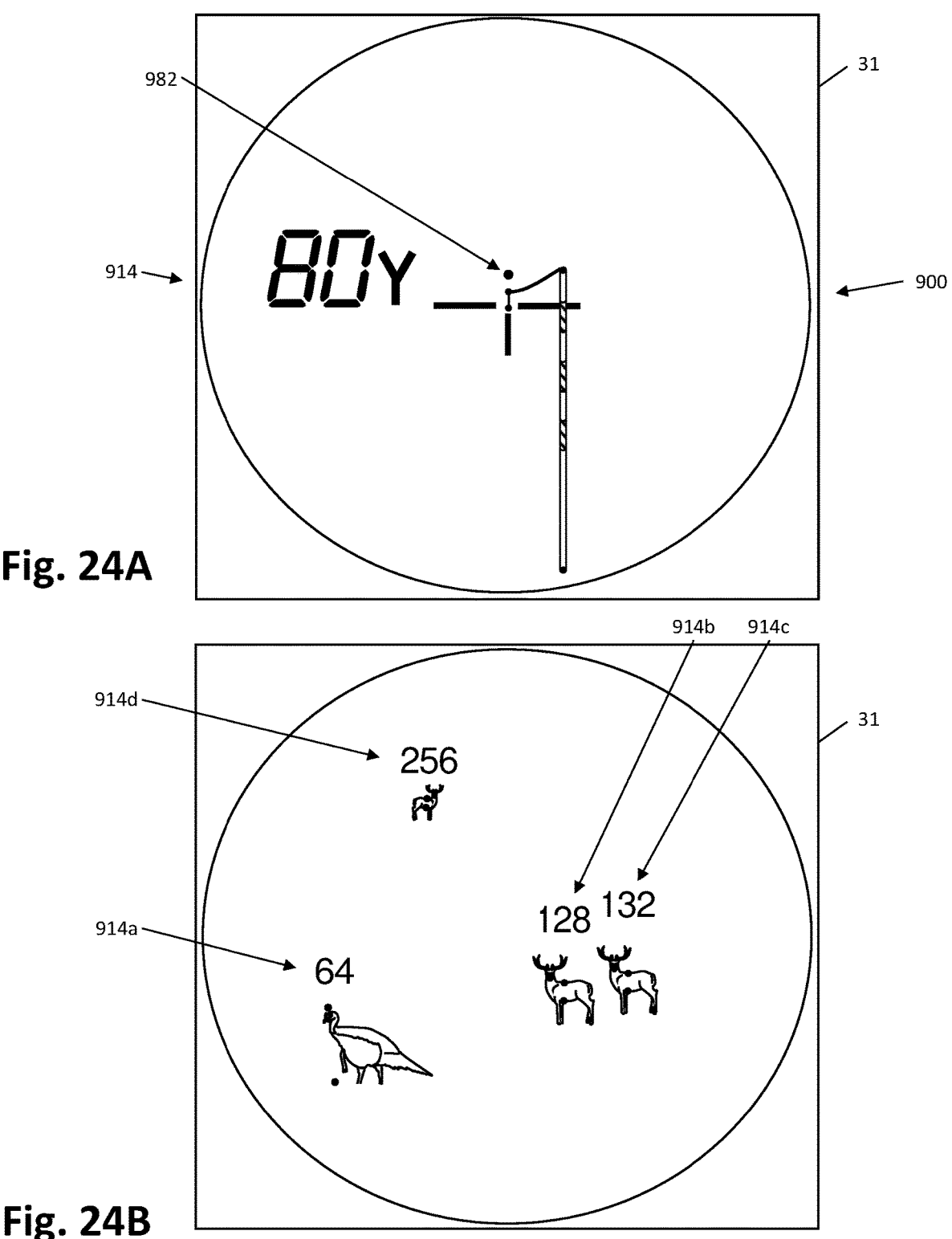
FIGS. 24A and 24B show displays for laser-less, no emission, range finding devices.

FIG. 24A illustrates a high-resolution display 31 showing an aiming point 982 based on a projectile trajectory path adjusted for range determined by detecting and measuring objects of known size. The crosshairs 900 are used to aim the AI device 10 towards the target, in this case the far rod. It also displays the captured image, in this case the two rods and their fiducial points (see FIG. 21). The range is calculated by analyzing the number of pixels in the height of the far rod 106*b* (FIG. 21). The range may be adjusted for shooting angle. The range of 80 yards is displayed in the horizontal distance indicator 914. Thus, range is determined without using any emission from the AI device 10, resulting in a laser-less handheld rangefinder.

FIG. 24B illustrates a high-resolution display 31 showing ranges superimposed over each detected object of known size. In this advanced embodiment, there is no need for crosshairs. The user simple aims the lens of the AI device 10 in the general direction of interest and each detected object is analyzed to determine its distance. The display 31 shows the captured image, along with fiducial points indicating that the object was detected and measured. The range is calculated by analyzing the number of pixels in the height of each object (see e.g., FIGS. 23A through 23G). The range of each detected objects is displayed over each object. Thus, range to multiple objects is determined without using any emission from the AI device 10, resulting in a enhanced, laser-less handheld rangefinder.

In this example, the turkey's distant 914*a* is shown as 64 yards, the first deer's distance 914*b* is shown as 128 yards, the second deer's distance 914*c* is shown as 132 yards, and the third deer's distance 914*d* is shown as 256 yards.

More Precise Classification and Distance Determination

After each object is detected, and its type is determined, the cropped or aligned-and-cropped image may optionally be passed to the AI device for further classification by a deep learning model. For example, the AI device 10 may further identify the specific model of the tank, e.g., an Abrams tank, or a Challenger 1 tank versus a Challenger 2 tank. The AI device 10 may further identify the specific model of a drone, e.g., a Lancet-3 (with a known length of 5' 5"), a Shahed-136 (with a known wingspan of 2.5 meters) or a Ukrjet UJ-22 (with a known 5-meter wing length). Once the specific model of tank is determined a more specific known height is used to refine the distance calculation. In the case of a deer, the AI device 10 may further classify the dear as a white tail deer, a black tail deer, or a mule deer. A mule deer will have a large known size from top of the back to the brisket of 20 to 24 inches. Once the deer is classified, the range to the deer is updated to provide a more accurate range. The AI device 10 may also classify the deer as a buck (male) or a doe (female) or as a juvenile and similarly provide a more accurate distance or range.

Smart Phone AI Range Finding Devices

Figures 25, 26:
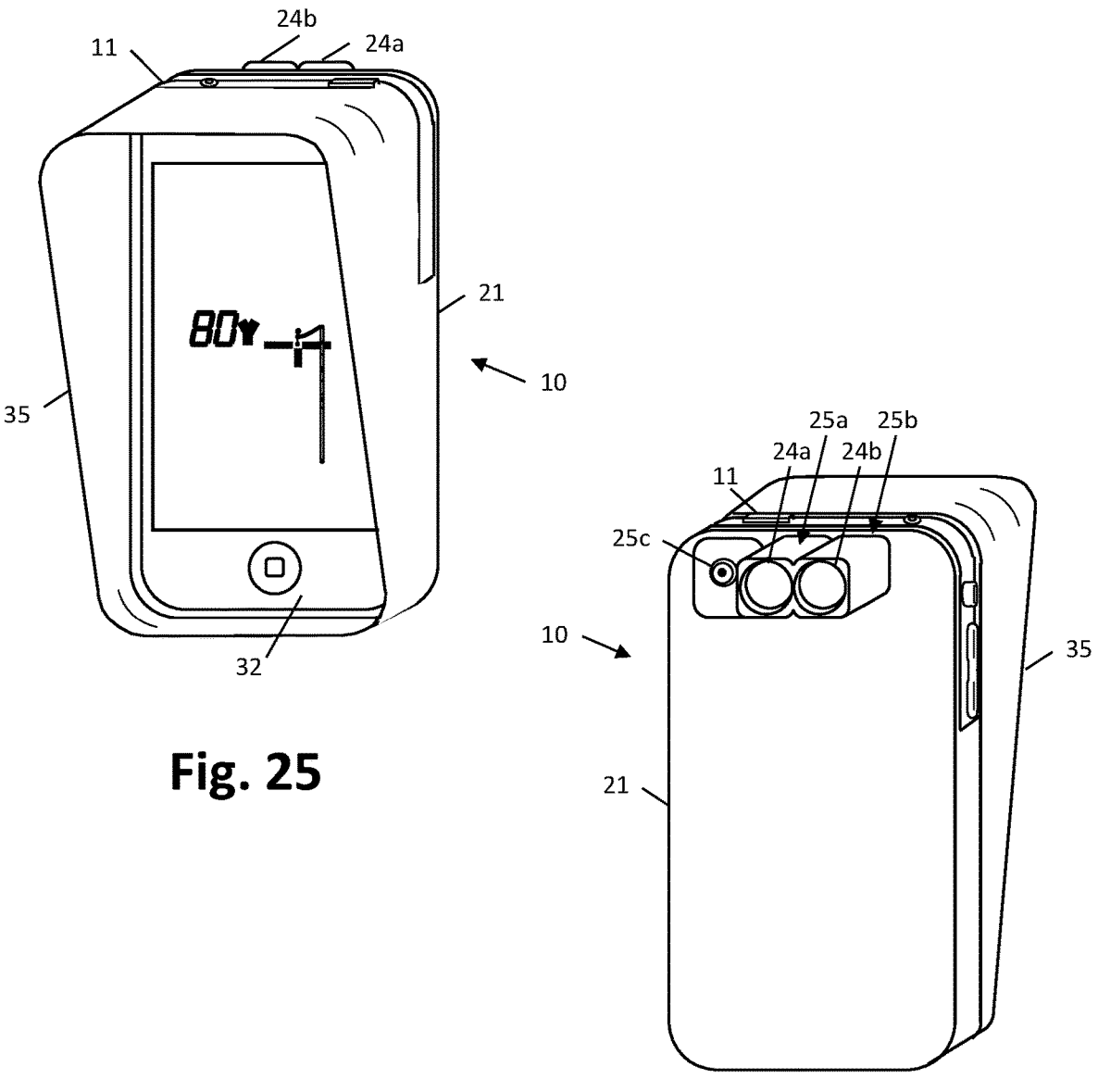
FIG. 25 is a rear perspective view of a smartphone-based rangefinder AI device.
FIG. 26 is a front perspective view of smartphone-based rangefinder AI device of FIG. 25.

FIGS. 25 and 26 are rear and front perspective views, respectively, of digital embodiments of AI device 10 using a smart phone 11 with additional and lens 24 and digital cameras 25 mounted on a case with a shroud 35.

The smartphone-based rangefinder AI device 10 comprise an alternative housing 21, having a low magnification lens 24a, a high magnification lens 24b, a low magnification image sensor 25a, a high magnification image sensor 25b, a conventional camera 25c, and inputs 32 in various places on exterior.

FIG. 25 shows the high-resolution digital display 31, showing the same results as in FIG. 24A.

AI Range Finding Devices with Low and High Magnification Lenses

Figure 27:
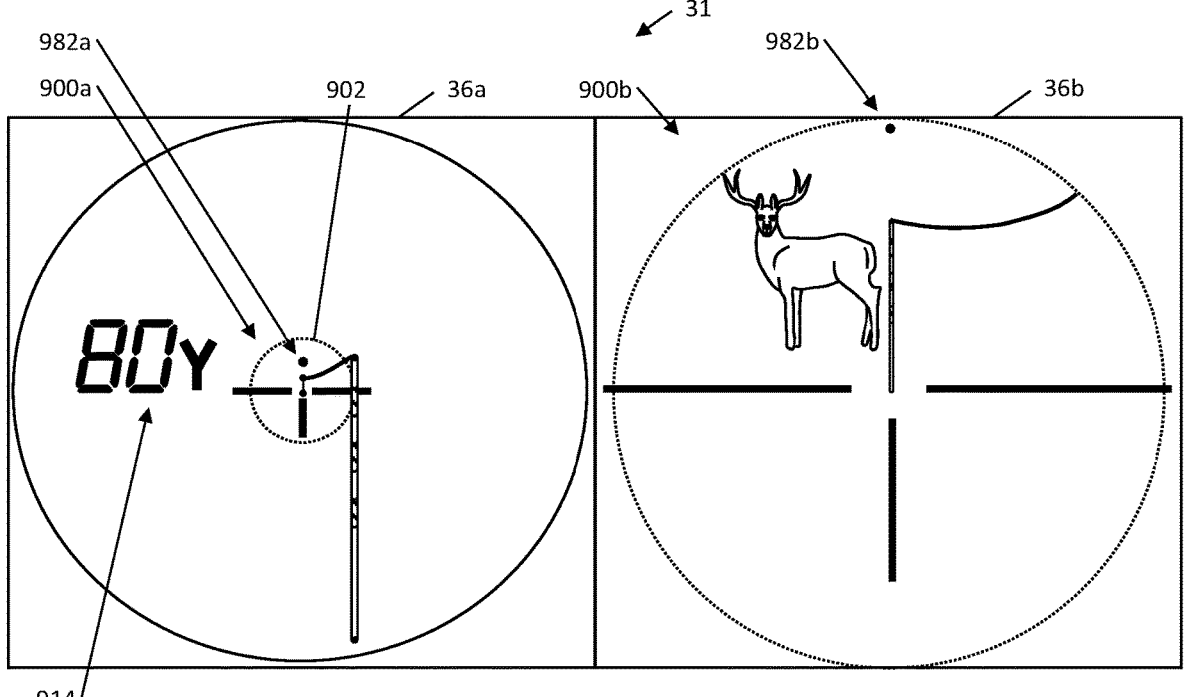
FIG. 27 illustrates a high-resolution digital display embodiment showing a low magnification digital image side-by-side with a high magnification digital image with crosshairs and aiming points.

FIG. 27 illustrates a high-resolution digital display 31 showing a low magnification digital image 36a side-by-side with a high magnification digital image 36b with crosshairs 900 and aiming points 982.

The low magnification digital image 36a is displayed with a dashed circle showing the magnification outline 902 of the portion of image 36a being simultaneously captured in the high magnification digital image 36b.

The low magnification digital image 36a is displayed with crosshairs 900a and is used to aim the AI device 10, and the high magnification digital image 36b is used by the deep learning model to determine the final distance to the target.

A low magnification crosshairs 900a is displayed centered in the low magnification digital image 36a, and the adjusted distance is displayed in the horizontal distance indicator 914.

A high magnification crosshairs 900b is displayed centered in the high magnification digital image 36b.

A low magnification aiming point 982a is displayed over the crosshairs 900a.

A high magnification aiming point 982b is displayed over the crosshairs 900b.

As discussed above regarding FIG. 21B, the crosshairs 900 are aimed at the 5-foot rod. AI device 10 can better determine the size by determining the number of pixels in each 6-inch band, as well as the entire 5-foot rod, and averaging the relative results. In this example, the deer was lost in the fog in the low magnification image 36a and thus was not the target. However, with the high magnification digital image 36b, the user can visualize the deer and re-aim the AI device so that the range to the deer can be recognized.

The display of FIG. 27 is our currently preferred best mode embodiment which we intend to market under the AimFinder™ trademark with DeepRange™ technology.

Advantages

No Laser or Emissions

The AI device provides accurate distance recognition without a laser or other detectable emissions.

Accurate

The AI device provides for accurate adjustment of aim based on more accurate identification of the height of a known object.

Effective

Because the AI device provides for accurate adjustment of aim for a range, each shot taken will be more effective.

Confidence

The AI range information gives the user confidence that the target has been properly identified (e.g., as legal game for which the hunter has a tag) and that a shot can be successfully taken. This increased confidence will improve the user's performance and satisfaction.

Increased Safety

More accurate aiming increases safety.

Adjustable

The embodiments of these AI device displays are adjustable to be consistent with an individual user and current type of target, for example, distances could be presented in yards or meters and the object of the current hunt could be set to "Mule Deer."

Lightweight

Handheld or portable mounted AI devices are lightweight.

Easy to Transport and Use

AI devices easy to transport and use.

Rapid Use

Embodiments that provide an aiming point are used rapidly without having to use brain power to select numbers and estimate an aiming point.

CONCLUSION, RAMIFICATION, AND SCOPE

Accordingly, the reader will see that the novel laser-less, no emission, range finders provide important information regarding the projectile trajectory path and importantly provide greater accuracy, effectiveness, and safety.

While the above descriptions contain several specifics these should not be construed as limitations on the scope of the invention, but rather as examples of some of the preferred embodiments thereof. Many other variations are possible. The high magnification digital image could be produced by a zoom lens system where the magnification is variable and passed as an input to the distance calculations. The AI device and methods could be applied to military situations where the projectiles are fired from a cannon, tank, ship, or aircraft and where the obstacles could be moving objects such as helicopters or warfighters. Additionally, the AI device and methods could be applied to golf where in a golf mode the device would indicate range based on the measured size of the flagpole in the hole, provide an aiming point and suggest which golf club would result in a ball trajectory that place the ball nearest the desired hole. The variations could be used without departing from the scope and spirit of the novel features of the present invention.

Accordingly, the scope of the invention should be determined not by the illustrated embodiments, but by the appended claims and their legal equivalents.

The invention claimed is:

1. An AI device for recognizing distance to a target, the AI device comprising:
  a) a computing element,
  b) a memory connected to the computing element,
  c) at least one image sensor, connected to the computer element,
  d) at least one lens with a known magnification, and
  e) a display connected to the computing element,
    wherein the image sensor captures a digital image having the known magnification,
    wherein the computing element recognizes one or more objects in the magnified digital image, wherein one object is determined to be the target,
    wherein the computing element recognizes an object type of the target, wherein the computing element calculates a preliminary distance to the target based on a known size of the object type and the known magnification of the digital image, wherein the computing element determines a bounding rectangle in the digital image which includes the target, wherein the computing element determines a plurality of fiducial points inside the bounding rectangle based on the object type, and wherein the computing element aligns the digital image based on the fiducial points and crops the aligned digital image forming a cropped aligned digital image.

2. The AI device of claim 1, further comprising a deep learning model implemented in the computing element and the memory, wherein the cropped image of the target object is provided as input to an input to the deep learning model.

3. The AI device of claim 2, wherein deep learning model comprises convolutional neural networks.

4. The AI device of claim 2, wherein during training, inputs to the deep learning model comprise:

a) cropped images of different types of objects, b) data regarding the images.

5. The AI device of claim 4, where the data regarding each of the images comprises:

a) type of object, b) distance to the object, c) at least one of the group of:

i) size of the object between two predetermined fiducial points, ii) gender of the object, iii) maturity of the object, and iv) species of the object.

6. The AI device of claim 2, wherein the AI device recognizes one or more classifications of the target object, the classifications comprising the group of:

a) species of the object, b) gender of the object, and c) maturity of the object, wherein the AI device computes a more accurate final distance to the target based on the one or more classifications.

7. The AI device of claim 2, wherein the AI device recognizes one or more classifications of the target object, the classifications comprising the group of:

a) type of vehicle, b) model of vehicle, c) make of vehicle, and d) year of vehicle, wherein the AI device computes a more accurate final distance to the target based on the one or more classifications, and wherein the final distance is displayed on the display.

8. The AI device of claim 2, further comprising crosshairs in the display for aiming at the target.

9. A method of using the AI device of claim 8 to recognize distance to the target, comprising the steps of:

a) training the deep learning model, b) aiming the AI device at the target by placing the crosshairs over the target, and c) pressing an operating button on the AI device.

10. The method of claim 9, further comprising the step of:

d) displaying the preliminary distance on the display.

11. The AI device of claim 6, wherein the final distance is displayed on the display.

12. The AI device of claim 6, wherein the species is displayed on the display.

13. The AI device of claim 7, wherein the vehicle type is displayed on the display.

14. The AI device of claim 13, wherein the vehicle model is displayed on the display.

15. The AI device of claim 1, comprising a laser-less range finding device, comprising:

a) crosshairs for positioning the range finding device to range the target, and b) a gyroscope and accelerometer for sensing an angle to the target, wherein the range finding device is one of the group of:

i) handheld rangefinder, ii) smart rifle scope, iii) binocular, and iv) smart phone, wherein the display comprises a shoot-for range indicator, whereby the display indicates a shoot-for range calculated from the recognized distance adjusted for shooting angle.

16. The range finding device of claim 15, wherein the display illuminates an aiming point.

17. The AI device of claim 2, wherein the type of object is one of the group of:

a) deer, b) antelope, c) elk, d) turkey, and e) ground hog.

18. An AI device for recognizing distance to a target, the AI device comprising:

a) a computing element, b) a memory connected to the computing element, c) at least one image sensor, connected to the computer element, d) at least one lens with a known magnification, and e) a display connected to the computing element, wherein the image sensor captures a digital image having the known magnification, wherein the computing element recognizes one or more objects in the magnified digital image, wherein one object is determined to be the target, wherein the computing element recognizes an object type of the target, wherein the computing element calculates a preliminary distance to the target based on a known size of the object type and the known magnification of the digital image, wherein a first image sensor is configured with a low magnification lens, wherein a second image sensor is configured with a high magnification lens, wherein a low magnification digital image is provided by the first image sensor, wherein a high magnification digital image is provided by the second image sensor, and wherein the display is configured to show both the low magnification digital image and the high magnification digital image.

19. The AI device of claim 18, wherein the AI device displays the preliminary distance to the target.

20. An AI device for recognizing distance to a target, the AI device comprising a laser-less range finding device, comprising a) a computing element, b) a memory connected to the computing element, c) at least one image sensor, connected to the computer element, d) at least one lens with a known magnification, e) a display connected to the computing element, wherein the image sensor captures a digital image having the known magnification, f) crosshairs for positioning the range finding device to range the target, and g) a means for sensing an angle to the target, wherein the computing element recognizes one or more objects in the magnified digital image, wherein one object is determined to be the target, wherein the computing element recognizes an object type of the target, wherein the computing element calculates a preliminary distance to the target based on a known size of the object type and the known magnification of the digital image, wherein the range finding device is one of the group of:

i) handheld rangefinder, ii) smart rifle scope, iii) binocular, and iv) smart phone, wherein the display comprises a shoot-for range indicator, whereby the display indicates a shoot-for range calculated from the recognized distance adjusted for the angle.

21. The AI device of claim 7, wherein type of vehicle is a tank, and wherein the AI device recognizes the make and model classifications of the tank, whereby the AI device computes the more accurate final distance to the tank based on a more specific known height of the make and model classifications of the tank.

* * * * *